(12) United States Patent
Heins et al.

(10) Patent No.: US 8,437,744 B1
(45) Date of Patent: May 7, 2013

(54) METHODS AND DEVICES FOR REMOTE PROCESSING OF INFORMATION ORIGINATING FROM A MOBILE COMMUNICATION DEVICE

(75) Inventors: Douglas Brian Heins, San Francisco, CA (US); Gregory Michael Morey, New York, NY (US)

(73) Assignee: ZeroTouchDigital, Inc., New York, NY (US)

( * ) Notice: Subject to any disclaimer, the term of this patent is extended or adjusted under 35 U.S.C. 154(b) by 732 days.

(21) Appl. No.: 12/108,284

(22) Filed: Apr. 23, 2008

(51) Int. Cl.
*H04L 12/58* (2006.01)
*H04M 3/00* (2006.01)

(52) U.S. Cl.
USPC .................... 455/412.1; 455/418; 455/419

(58) Field of Classification Search .................. None
See application file for complete search history.

(56) References Cited

U.S. PATENT DOCUMENTS

| | | | |
|---|---|---|---|
| 5,835,061 A | 11/1998 | Stewart | |
| 6,452,498 B2 | 9/2002 | Stewart | |
| 2003/0157960 A1* | 8/2003 | Kennedy | 455/556 |
| 2006/0189349 A1* | 8/2006 | Montulli et al. | 455/556.1 |
| 2006/0264209 A1* | 11/2006 | Atkinson et al. | 455/422.1 |
| 2006/0270452 A1* | 11/2006 | Gerzberg | 455/557 |
| 2007/0207793 A1* | 9/2007 | Myer et al. | 455/419 |
| 2007/0239934 A1* | 10/2007 | Watanabe | 711/114 |
| 2007/0270169 A1* | 11/2007 | Buchhop et al. | 455/466 |
| 2010/0022231 A1 | 1/2010 | Heins et al. | |

OTHER PUBLICATIONS

AT&T Smart Limits for Wireless, printed on Mar. 18, 2008, http://www.wireless.att.com/learn/articles-resources/parental-controls/smart-limits.jsp?source=EX76 . . . (2 pgs.).
"A Phone for Them—No Worries for You," printed on Mar. 14, 2008, The New AT&T Your World Delivered (1 pg.).
"Google's Wi-Fi Patent May Face Wayport Challenges," WNN Wi-Fi Net News, Mar. 29, 2006, http://wifinetnews.com/archives/006431.html (3 pgs.).
"AT&T Offers Service to Control Children Mobile Phone Use," Cell Phone Digest, Sep. 4, 2007, http://www.cellphonedigest.net/news/2007/09/att_offers_service_to_control.php.
U.S. Appl. No. 12/198,518, filed Aug. 26, 2008. (91 pages).

* cited by examiner

*Primary Examiner* — Erika A Washington
(74) *Attorney, Agent, or Firm* — DLA Piper LLP (US)

(57) ABSTRACT

In part the invention relates to a method of providing remote access to data generated by a mobile device having a device storage element. The method includes the steps of monitoring the mobile device such that changes in local data resident in the device storage element are detected using a client application installed on the mobile device, wherein the changes in the local data accumulate during a period of time to comprise at least one change set; transmitting the at least one change set over a network; receiving the at least one change set at a remote server, the remote server having a remote storage element; and processing the at least one change set using a server application to generate user accessible remote data.

39 Claims, 22 Drawing Sheets

METHODS AND DEVICES FOR REMOTE PROCESSING OF INFORMATION ORIGINATING FROM A MOBILE COMMUNICATION DEVICE

FIELD OF INVENTION

Various embodiments of the invention relate to monitoring a mobile communication device to detect changes and provide enhanced services to the user of the device. Specifically, various embodiments relate to the automatic processing, transmission, and/or remote storing of information originating from, captured by or otherwise accessible on the mobile device.

BACKGROUND OF THE INVENTION

Mobile communication devices such as phones, laptops, personal digital assistants, content players, and other similar devices are now pervasive in many parts of the world. In many developing countries, since cellular phone based systems are easier to install and offer the immediate benefit of portability to the end users, a landline based telephone system is not being developed. As a result, given the rising dominance of mobile devices relative to land lines, many changes are occurring in the telecommunication business.

On a related note, as more and more features are being integrated into modern communications devices (cameras, positioning systems, video and music playing functionality, etc.) end users are relying on these devices and using them as a multi-function replacement for many application specific electronic devices. However, storing information on a mobile devices and using it as a replacement for various application specific devices, such as a camera or a GPS device, raises challenges and problems not found in the stand alone devices.

Therefore, a need exists for devices, methods and systems that address the underlying data management challenges associated with the worldwide shift toward using mobile communication devices in lieu of land lines and other application specific devices.

BRIEF DESCRIPTION OF THE DRAWINGS

Various embodiments and other aspects of this invention will be readily apparent from the detailed description below and the appended drawings, which are meant to illustrate and not to limit the invention, and in which.

DETAILED DESCRIPTION

In general, embodiments of the invention use various communication protocols and networks to monitor changes in certain categories of data associated with, resident on, captured using, or otherwise generated by a user's mobile device. In one embodiment, the invention relates to systems, methods, and devices that monitor changes in a mobile device, and enable automatic (or user controlled) processing (or archiving) of information generated using the mobile device. Further, according to one embodiment, the information generated using the mobile device is transmitted to a remote user accessible device for processing and/or storage. The information generated using the mobile device may include a change set indicative of new information existing on the mobile device relative to a previous point in time. In addition, systems and methods described herein may be bi-directional such that data can be both sent from and sent to a mobile device.

In one preferred embodiment, the invention allows photos generated using the camera of (or otherwise transmitted to) the mobile device to be subsequently transmitted to a remote location for further processing or archiving. In one specific preferred embodiment, the further processing includes moving a user's pictures from their mobile device to a browser accessible photo archive in response to a user action or automatically as configured by the device user. The use of the camera features associated with many mobile devices allows embodiments of the invention to be extended to any imaging-based capture system. For example, the mobile device can be used to "image" or photograph a symbol, such as a barcode. Once captured, the barcode can be routed to a remote server or remote peer for processing by a digital imaging application. In this way, a barcode can be used to order goods and services using one embodiment of the invention.

The techniques disclosed herein enable the remote archiving or remote processing of any suitable type of file, data, or content generated using a mobile device. Thus, logs for calls made and received, text messages, personal notes, voice memos such as dictation files, emails, voicemails, pictures, and other content or media files generated using a mobile device can all be processed remotely or archived as desired using the methods and devices disclosed herein. In one embodiment, the methods described herein are activated in response to a single user action. This single user action can include, but is not limited to turning the mobile device "on," selecting an application from a menu, sending an email, taking a picture, sending a text message, listening to a voicemail, writing a note, generating a change in the state of the mobile device, and transmitting or receiving local data.

Figure 1:
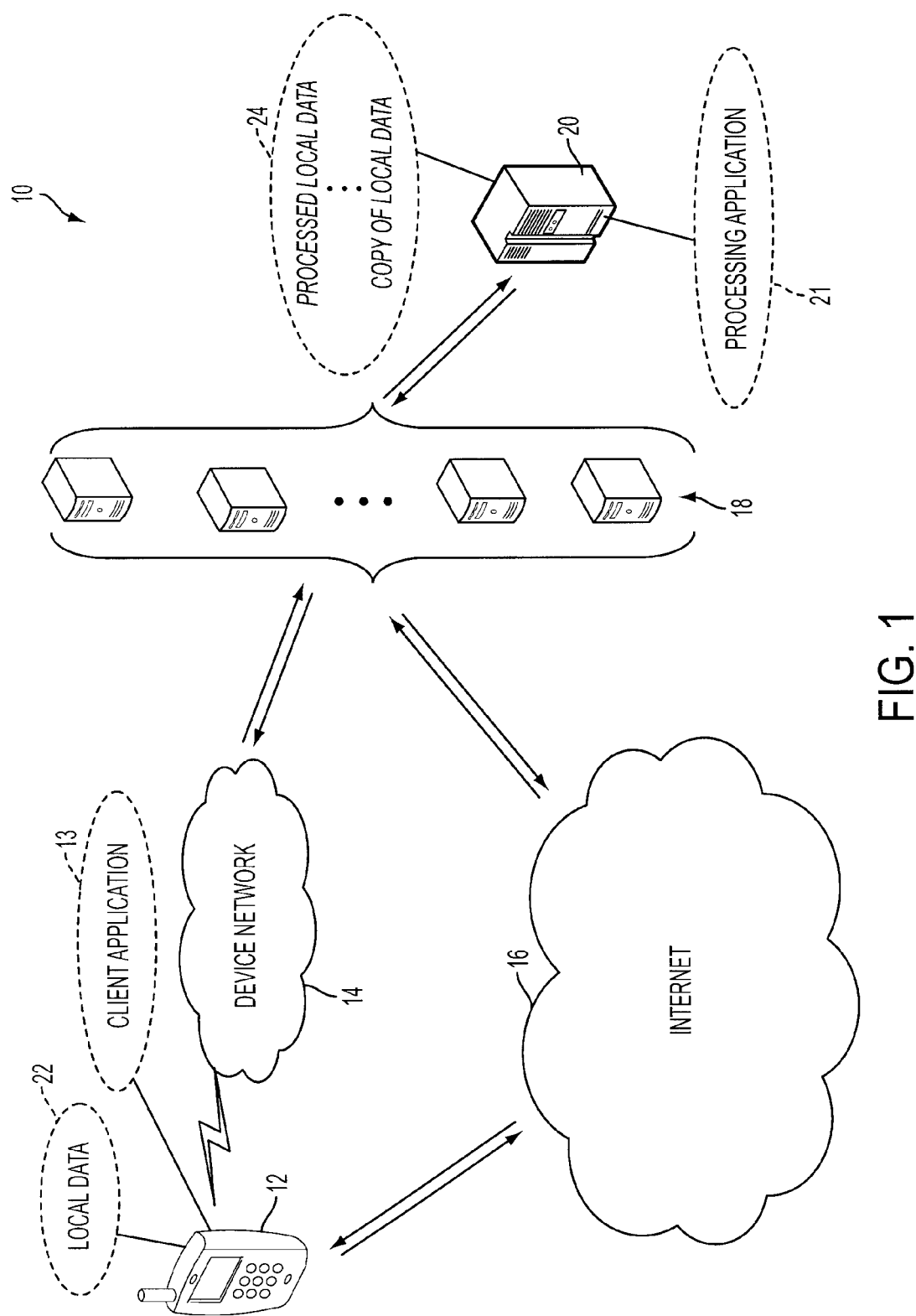
FIG. 1 is a diagram illustrating a network-based system suitable for implementing an embodiment of the invention.

An exemplary network based system 10 for implementing an embodiment of the invention is illustrated in FIG. 1. Specifically, as shown in the figure, a mobile communication device 12 (alternatively, a first peer) is shown that includes a software application, such as a client application or a peer-to-peer based application, 13 suitable for performing many of the transmission, data streaming, and switching functions described in more detail below. Although the software application can be a client application, the recital of the term "client application" can also be considered to encompass a peer-to-peer application 13 which is also suitable for use with the methods and devices described herein.

The client application 13 is configured to be data channel independent when selecting remote peers or processing elements to transmit and/or process data. As used herein, a peer is a device, processing element, program, or other software element that includes at least one of a software component or a hardware component suitable for transmitting data and communicating with other software or hardware devices. For example, a peer can include, but is not limited to the mobile device, the client application, a server, a browser, a database, a processing application, a digital video recorder, a cable set top box, an online photo archive, or any other suitable software or hardware element that can communicate with a mobile device.

Returning to FIG. 1, the mobile device 12 is shown transmitting data or otherwise communicating via a device network 14 or via the Internet 16. In turn, both the device network 14 and the Internet 16 are in communication with a plurality of processing elements or peers (generally 18). This group of peers 18 is in communication with an application server 20 (alternatively, a second peer) that includes a processing application 21. The processing elements or peers 18 receive local data, or a version thereof, from the mobile device 12. Additional detail relating to the type, characteristics, organization, and communication links between suitable peers or processing links is discussed below in more detail with respect to FIGS. 2A-2B and FIG. 3.

The processing elements or peer group 18 can include multiple servers. This follows because as local data is transmitted from the mobile device to a peer group, client application or related service, the data need not go to the same peer each and every time. For example, that peer may be under a load, so the client application or related service may transmit via a different server. Thus, a handheld peer, such a mobile device running the client application 13 can arbitrarily choose a peer from the group of peers 18 that has a server implementation, such as the HTTP, email, or SMS servers shown in FIG. 2A, to which it wants to connect.

In one preferred embodiment, the mobile device transmits data for remote processing using a connectionless protocol, such as a datagram based protocol. According to one embodiment, a datagram is a self-contained, independent data element carrying sufficient information to be routed from a mobile device to a destination peer, application server 20, or processing application 21 without reliance on earlier exchanges between the mobile device and destination processing element and the transporting network.

The client application 13 can include certain routines and modules suitable for modifying data sent from the mobile device to include headers, wrappers or other routing information that identifies the data as coming through a particular channel, provides mobile device authentication information, such as the International Mobile Equipment Identity ("IMEI"), identifying where the data needs to go, identifying where the data is coming from, identifying the user of the mobile device, and identifying where the local data, or a version thereof, is supposed to be sent. However, the IMEI is not the only means of authenticating information and any suitable secure identifier can be used in a given embodiment.

The client application 13 typically operates using a connectionless approach such that a persistent connection is not needed to function. Instead, when an opportunity exists to send data using any particular channel or protocol, the device 12 uses that opportunity to offload local data and transmit to a remote device. Thus, local data (or a version thereof) can be sent from the mobile device 12 using a data stream, broadcasts, email, text messages, TCP/IP, HTTP, FTP, datagrams, or other suitable data transfer protocols or transmission channels.

In addition, in one embodiment, the client application 13 uses a data flow (or streams) across one or more peers to achieve certain data transport and processing objectives. The client application 13 executes across the sum of peers required to achieve the end objective of either processing or archiving data, in one embodiment. This execution across one or more peers 18 can be performed using a routing module resident on a peer or within the client application. The function of the routing module is to capture the change set and communicate the change set once the network connection is available to transmit reliable data. Thus, the routing module employs a connectionless protocol in one embodiment.

The client application 13 can be written in various programming languages such as objective-C or Java. The client application can also be implemented on a mobile device using standard Borne shell scripts. According to one embodiment, a shell script is a program interpreted and executed by a shell, or other interpreter. However, any suitable programming language can be used to design a client application that performs as outlined herein.

From the mobile device's and client application's perspective, the device 12 selects the peer group 18 and ensures that portions of local data 22 combine as a final product that forms a single archive or other data structure of all change sets in that particular device. This resultant transmission of local data 22 to an application server 20 may occur through different pathways or streams of data sent through a group of peers 18. The archive is consolidated at a remote location, such as an archive of processing server 20. In one embodiment, active consolidation of portions of local data at a remote location occurs within a peer group 18 through a series of data flows or streams using a connectionless protocol.

The processing application 21 can be any suitable software application that receives, processes, converts, archives, or otherwise interacts with data, such as local data 22 or a portion thereof, originating from the mobile device 12. Alternatively, the processing application 21 can be any suitable software application that generates processed local data 24 such as a copy of local data 24.

Before describing the flow of information in greater detail with respect to the elements depicted in the overall system 10, one skilled in the art should recognize that although a device network, mobile communication device, a group of processing elements, and an application server are all shown as separate and distinct from the Internet 16 all of the elements shown in FIG. 1 can all be linked by or exist within the Internet 16 or any suitable subset thereof or other type of network without deviating from the scope and spirit of the invention.

The client application 13 installed on the mobile communication device 12 includes modules and routines to accomplish several novel objectives. The first objective is monitoring changes on the mobile devices 12. The second objective is to transmit data associated with a change in the data content of the mobile device 12. The application monitors data changes to detect anything that is changing in that mobile device environment. For example, these changes can involve contacts, events, insertions, deletions, modifications, calls made, calls received, text messages sent, text messages received, notes and other content changes, voice memos, voicemail that is stored as local data on the mobile device, GPS tag data, photos, and other different modalities of user-generated content that can occur on a handset.

Since the second function of the mobile device is to offload data, there is a temporal period in which the client application begins accumulating one or more change sets such that when client application or related service can make a valid connection, the client application or related service can start pushing such one or more change sets to processing element, such as an SMS server or an application server.

The client application can process: memos, voicemails, pictures, text messages, and other file types. The application streams a subset of local data and archives it offline such that they can be accessed through a browser, a proprietary application, a web server or other suitable device or software component in one embodiment.

Returning to FIG. 1, a mobile communication device 12 is shown. This device can be any suitable communication device now known or otherwise developed in the future, such as a smart phone, personal digital assistant (PDA), cellular telephone, media player, and laptop. In general, in a preferred embodiment, the device 12 includes a processing element, a storage element such as a hard drive or flash memory, a transmitter, and other suitable hardware and software as appropriate to transmit or otherwise stream data from the device to a remote location, a peer, or other remote processing element.

Typically, the mobile device 12 includes an input device. This input is responsive to a user action. The device also includes a storage element. The storage element is sized to store local data 22. Local data can include any data element stored on, captured by, or otherwise accessible in the device. Examples of local data include, but are not limited to pictures, media files, emails, text messages, voicemails, memos, notes, and logs.

A client application 13, such as a transmission application, is stored within the storage element. The client application is designed to transmit at least a portion of local data 22, a media file to a remote location such as the application server 20. A processor is also part of the mobile device 12. The processor is programmed to detect changes in any local data, such as media files stored in the storage element and initialize the transmission application in response to a user action. The user action may include a preset signal to automatically archive all data on the devices or a specific command by a user to transmit the local data to the remote application server for handling by the processing application. The mobile device 12 also includes a transmitter in electronic communication with the processor and the storage.

Figure 2A:
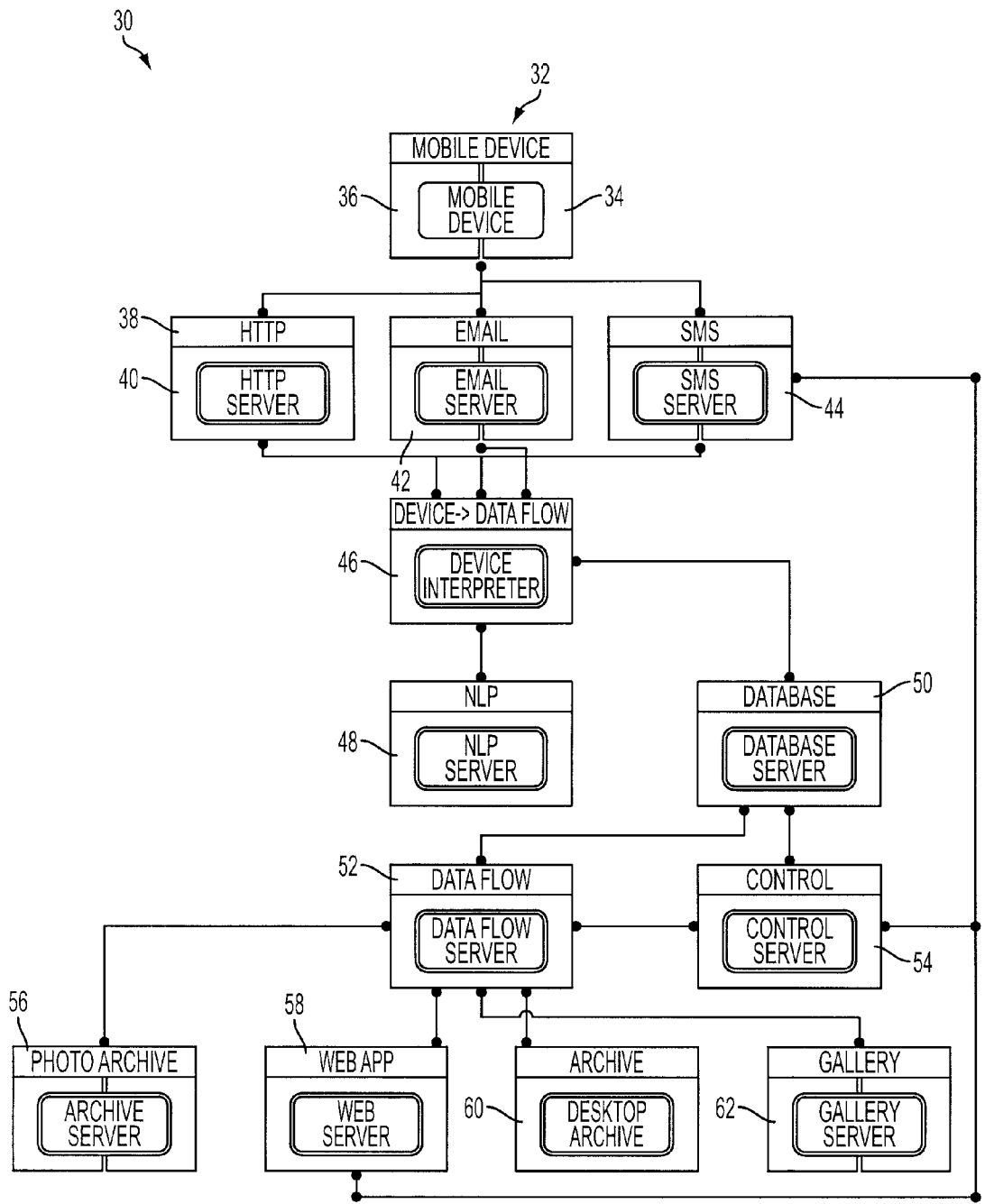
FIG. 2A is a diagram illustrating a network-based system suitable for implementing an embodiment of the invention.

FIG. 2A illustrates a system 30 that includes a plurality of devices, servers, software components, and communication elements suitable for transmitting, routing, and processing local data from a mobile device such that it arrives at a remote location. This system provides additional detail relative to the system 10 illustrated in FIG. 1.

As shown in FIG. 2A, a mobile device 32 includes a client application such as the client application 13 discussed above with respect to FIG. 1. The client application resident on the mobile device 32 may include a particular application programming interface (API) 34 that communicates and performs certain functions relative to software and/or hardware components 36 that are specific to the mobile device 32. In contrast, certain peers depicted in FIG. 2A such as HTTP server 38 are configured such that the underlying software 40 running on the server is exclusively under the control of the service offering that is paired with the client application.

Thus, certain peers may be exclusively controlled by a service offering that works with the client application, such as remote photo archiving service; certain peers may be independent of any service offering and simply route information from the client application; or a combination of both of these options such that some components of the peer are controlled by the service offering while others are not.

As discussed above the mobile device 32 captures or receives various types of content such as visual voicemail, pictures, notes, SMS sent/received, a call log, emails, and various other types of local data that change based on the activities and subscriptions of the mobile device user. The local data also includes meta-data and version information associated with each of the foregoing files and any other files that can be stored on or generated using the mobile device. In order to transmit, process, and route local data, such as data streams and change sets from the mobile device 32, the device 32 communicates with various processing elements or peers as shown in FIG. 2A.

Specifically, as shown in FIG. 2A, the mobile device 32 initially communicates with one of an HTTP server 38, an email server 42, or an SMS server 44. The role of the HTTP server 38 is to send HTTP messages and receive HTTP messages which are forwarded to other servers or devices as shown in the figure. The HTTP server is present to support different firewall constraints as needed for some embodiments. The email server 42 sends and receives email messages. Finally, the SMS server 44 sends SMS messages and receives SMS messages. Each of the HTTP server 38, email server 42, and SMS server 44 all communicate and pass data through a device interpreter 46.

In one embodiment, a device interpreter 46 is used because the underlying data sent from the mobile device 32, such as, but not limited to emails, HTTP messages, and/or SMS messages, may vary based on the type of mobile device being used and the configuration of the client application. Thus, a phone may transmit change set data differently than an mp3 player.

As a result, a device interpreter 46 is used to receive, understand, and translate or convert the relevant data, such as change sets and other content. Thus, different types of data that originate from a mobile device can be interpreted on a device by device basis. Thus, data streams that originate from a mobile device can be standardized using an interpreter 46. In one embodiment, the protocols at issue are device-specific. Accordingly, an interpreter or interpreter module would be installed on a server for each class of devices. Once the relevant data from the mobile device has been interpreted, depending on the type of data at issue, in one embodiment the data will continue to the natural language processing server 48, the database server 50 or both.

The natural language processing (NLP) server 48 performs services for translating basic natural language commands and queries into a data flow or data stream. As an example, the client application can act as a remote control using a text messaging modality. Thus, instead of logging into a browser and remotely accessing a service, such as an online photo archive, a user of the mobile device can instead simply send a message that is routed from the client application to the NLP server 48.

Once received by the NLP server 48, the server processes the text message and sends out a signal to accomplish an objective. With respect to the photo archive example, the signal may be to turn "off" the receive feature of a user's photo archive account such that photos are not automatically archived until another text message (or other user input) is sent to turn the particular account feature back "on" so that it can receive data (photos created as local data) from the mobile device 32. In addition to the NLP server 48, the group of peers can also include a data repository in the form of a database server 50.

The database server 50 can store copies of or processed versions of any type of local data generated on the mobile device 32. The database 50 also includes software that grants access to various different file stores and databases that are used by the peers that work in conjunction with the client application. Thus, if a photo archive service or voicemail archive service is being offered, the client application sends out the data, and the database server acts as a remote location where a copy of the data is stored. For example, the database archive can function as the archive of all the change sets associated with one or more mobile devices. In one embodiment, the database is a mySQL database. In turn, the database server 50 is in communication with a data flow server 52 and a control server 54.

The data flow (or data stream) server 52 provides services for translating basic mobile device changes sets into basic a data flow or data stream which will be customized in response to input from the control server 54. As discussed above, multiple data streams, such as change sets, are created using a mobile device with a client application. Services for insuring all strands are processed, audited, logged and/or archived are provided by the control server 54. The customization and regulation processes that oversee and control the service offerings, such as photo archiving, paired with the client application are performed by the control server 54. For example, the control server 54 may access the database server 50 to identify which mobile device users subscribe to different client application based services in order to control which functionalities are made available to those users.

The last tier of peers shown in FIG. 2A includes an archive server 56, a web server 58, a desktop archive 60 and a gallery server 62. The archive server 56 provides services to upload pictures to a third party picture archive. The web server 58 provides services to upload content to an application suitable for arranging files and activities in time, such as an event calendaring application, such as the interface shown in FIG. 4C. In part, this is facilitated by the integration of time stamp data in the local data that is sent or received. The integration of time stamp data, typically within the meta-data, in a given file allows for tracking of the events associated with the generation of local data and the local data itself.

The desktop archive 60 provides services to upload content to personal desktops such as sending photo repositories to a home computer, set top cable box, or other user controlled electronic devices. Finally, the gallery server 62 provides services to upload pictures to third party gallery web-based photo album. In one embodiment, the gallery server automatically prepares a printed photo album based on a selection of photo transmitted from a user's mobile device 32.

Figure 2B:
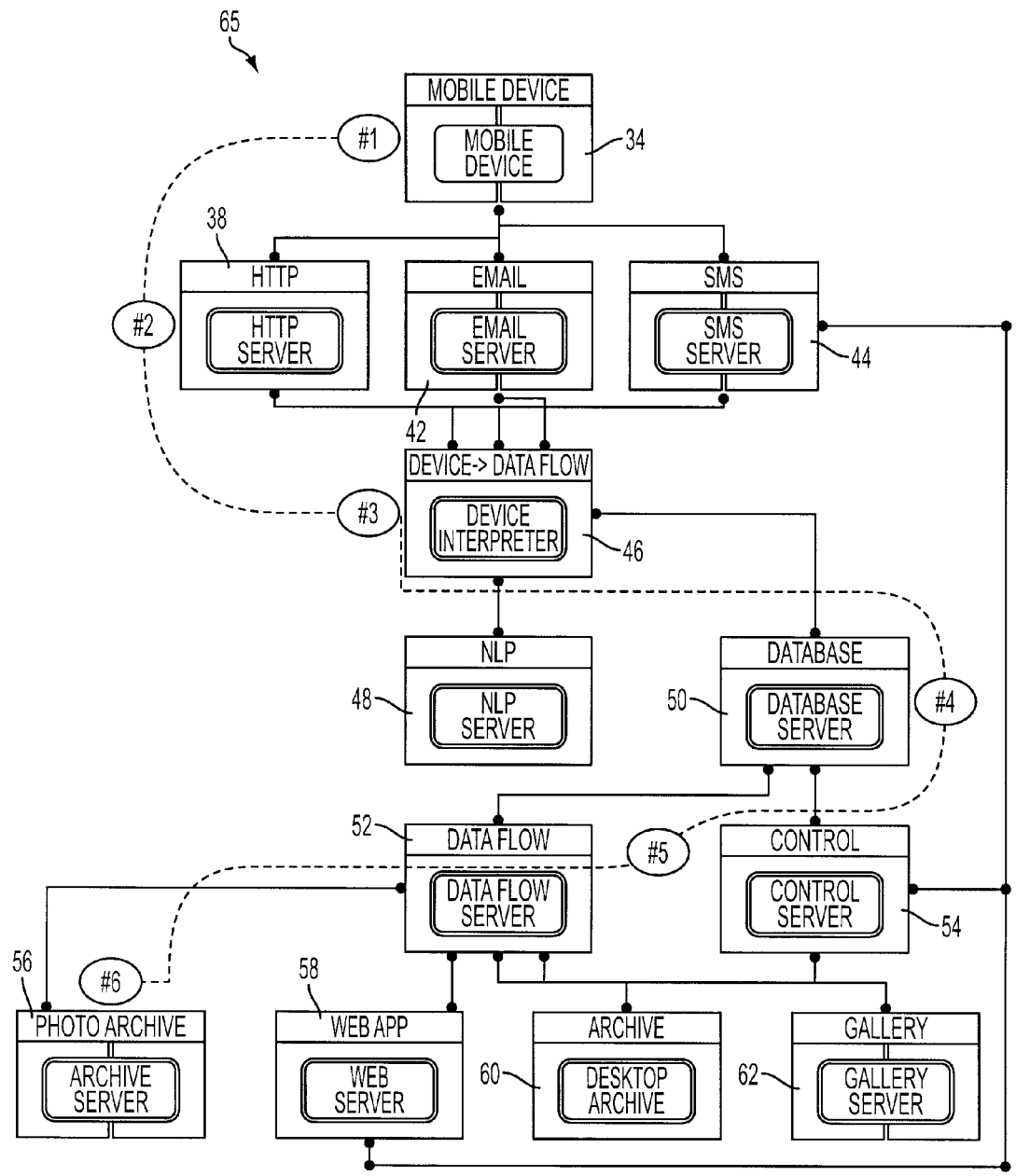
FIG. 2B is a diagram illustrating a specific flow of information with respect to the system of FIG. 2A according to an embodiment of the invention.

FIG. 2B shows the sequence of steps (steps #1-#6) associated with archiving pictures generated on the mobile device at a remote location according to one embodiment. As shown, in step #1, initially the client application transmits local data that includes one or more photos to an HTTP server 38 where the local data is received in step #2. Next, in step #3, data flows, in the form of a stream or other suitable configuration from the HTTP server to a device interpreter 46. As shown in the figure, the underlying data associated with the local photo data is stored in the database in step #4. In step #5, the data flow server 52 routes the local photo data based on routing information provided by the client application. Specifically, the local data is routed as a data stream that feeds into an online photo archive hosted on the archive server 56 where it is stored pursuant to step #6.

Figure 3:
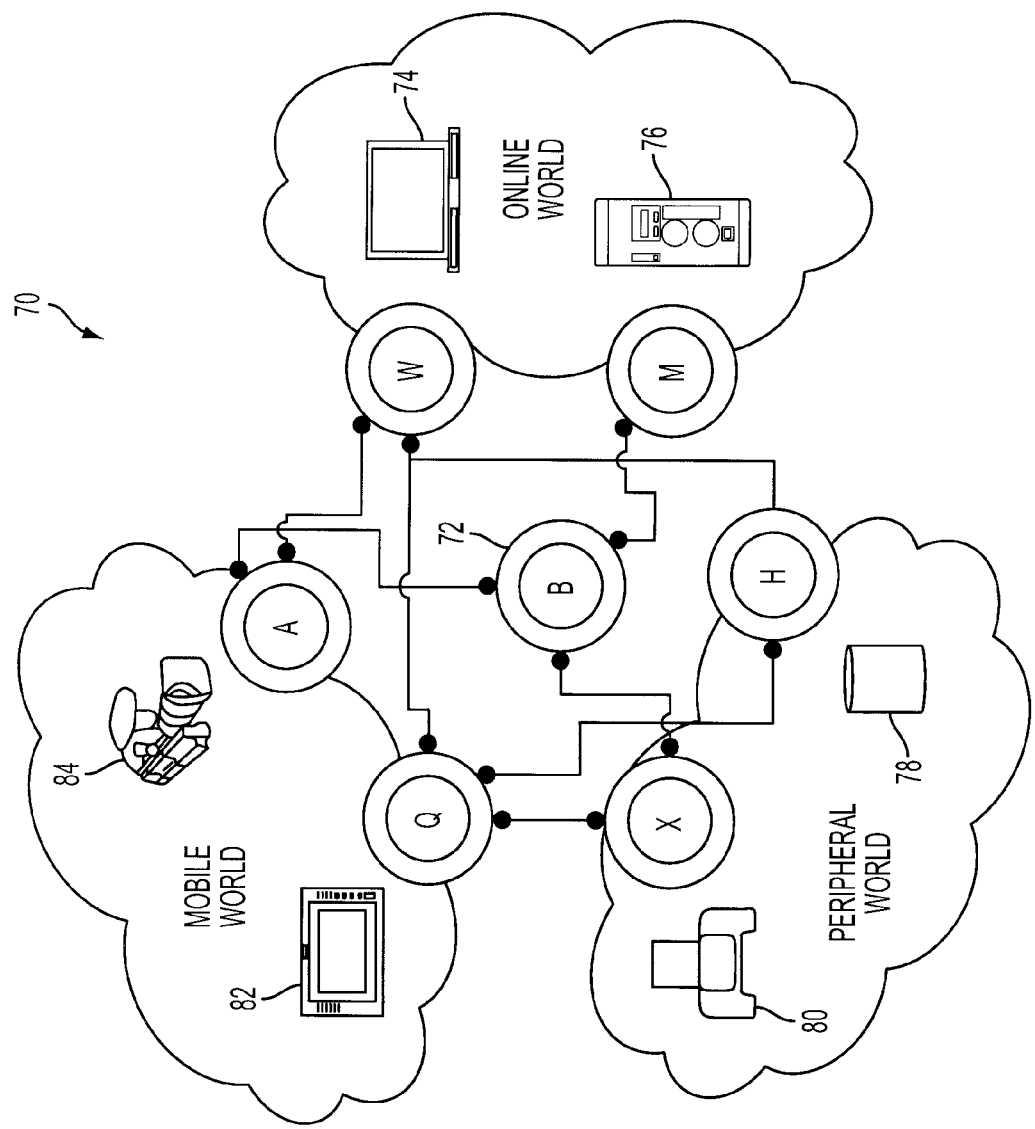
FIG. 3 is a diagram illustrating a collection of peers or processing elements suitable for exchanging data according to an embodiment of the invention.

FIG. 3 shows a collection of processing elements or peers 70, linked by nodes A, Q, X, H, M, W and B, to which a mobile device 72 can communicate and receive and transmit data. Specifically, a laptop 74, desktop computer 76, a data storage element 78, a printer 80, a PDA 82, and a video camera 84, as well as other devices not shown, can all serve as peer devices suitable for receiving data and commands from the mobile device 72. As shown, local data can be archived, processed or transmitted to any number of peer devices. The peer based processing and data exchange between the devices shown in FIG. 3 allow data to be continuously or periodically processed. Further, data back-up can be performed in the background such that it is invisible to the use of the device. All contacts, logs of calls placed and received, messages, email, SMS, images, video, MMS, tasks, notes, files or other content stored on mobile device can be transmitted through the nodes shown to various peer devices as applicable.

FIGS. 4A-4J are screenshots depicting a user interface that can be made available to a user through a browser, a mobile live, or as a standalone application. The interface provides a user with various options, controls, and data filters that they can use when accessing a remote application that contains a processed or archived version of the local data that was transmitted from their mobile device to a remote application. In one embodiment, the user interface is implemented using a Wiki based approach.

Figure 4A:
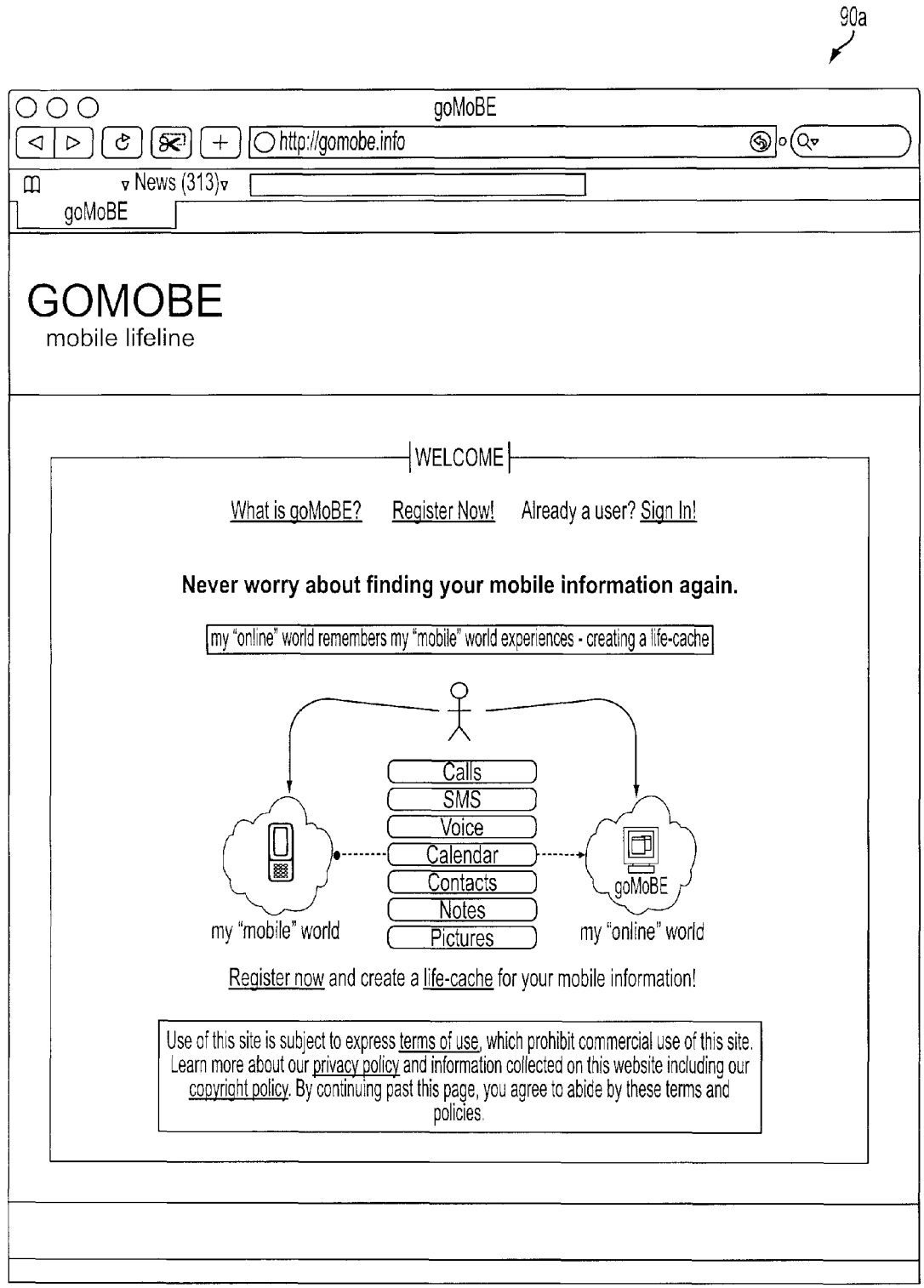
FIGS. 4A-4J are screenshots illustrating different features of a user interface suitable for providing access to data according to an embodiment of the invention.
Figure 4B:
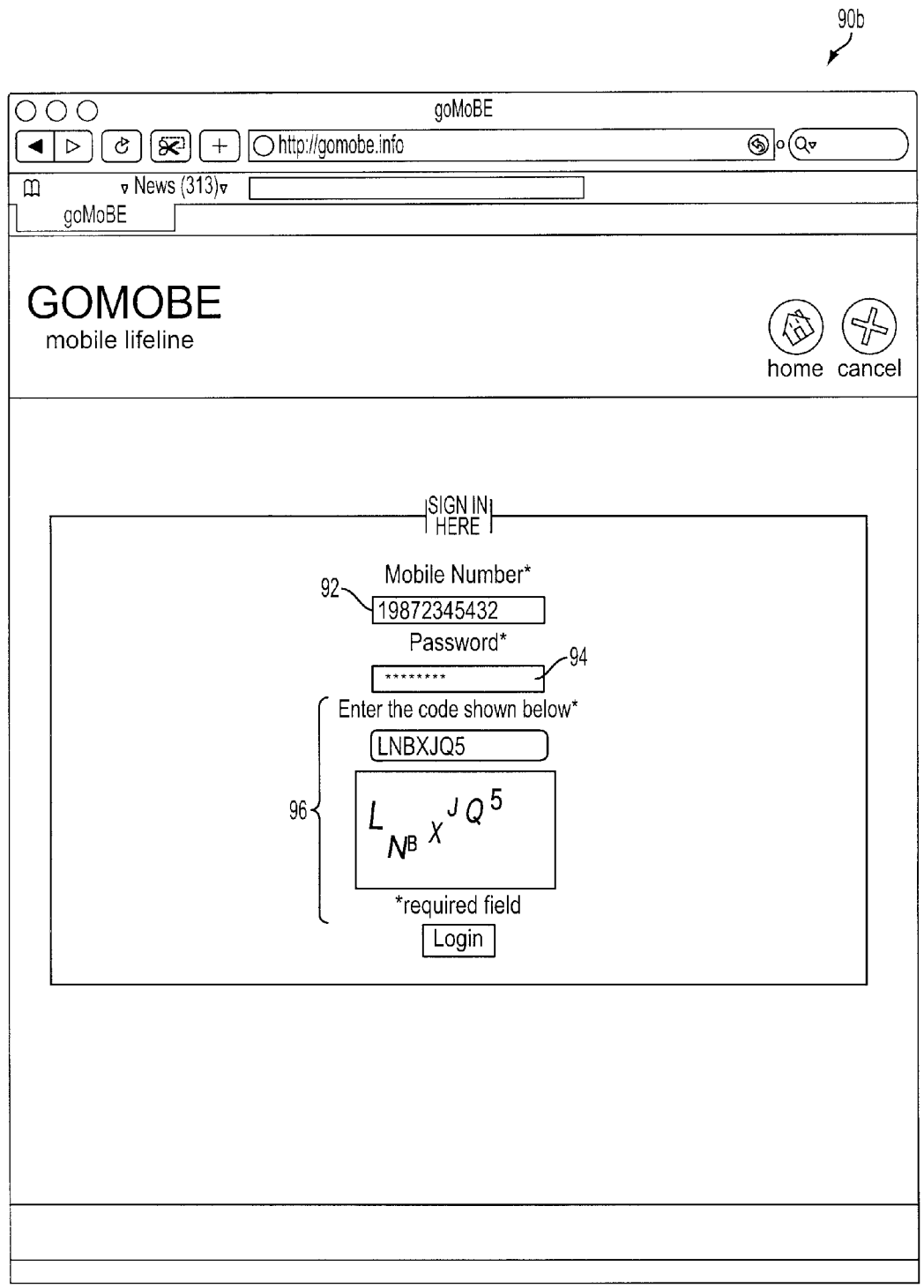

In FIG. 4A, a screenshot 90*a* of a user interface of a home screen is illustrated. Similarly, in FIG. 4B, a screenshot 90*b* of a user interface of a login screen is illustrated. In one embodiment the login interface requires the input of an account identifier 92, such as a mobile number, a password 94 and a unique code 96 randomly generated to prevent automated scripting and web robots from improperly accessing the system.

Figures 1, 4C:
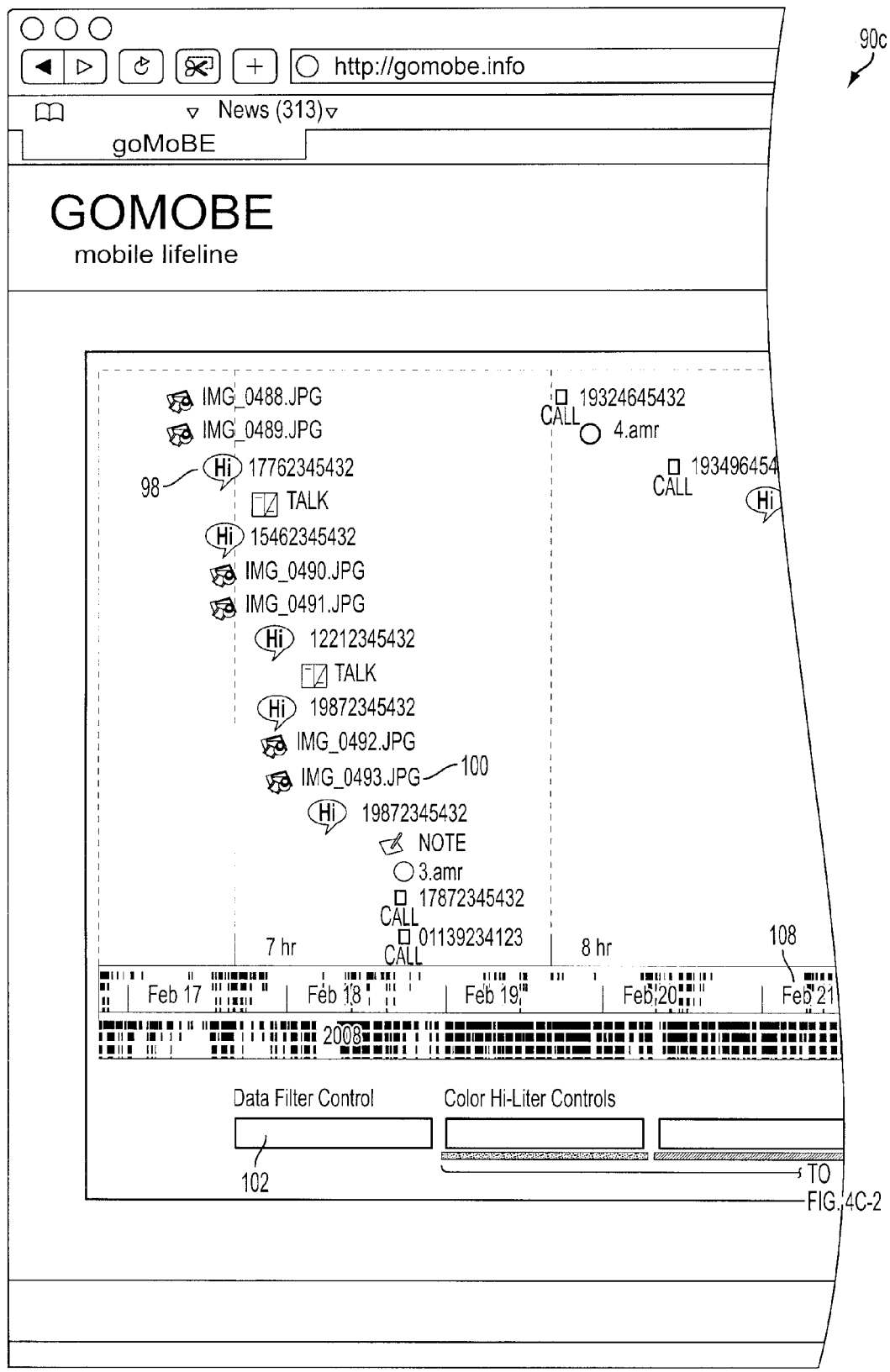
Figures 2, 4C:
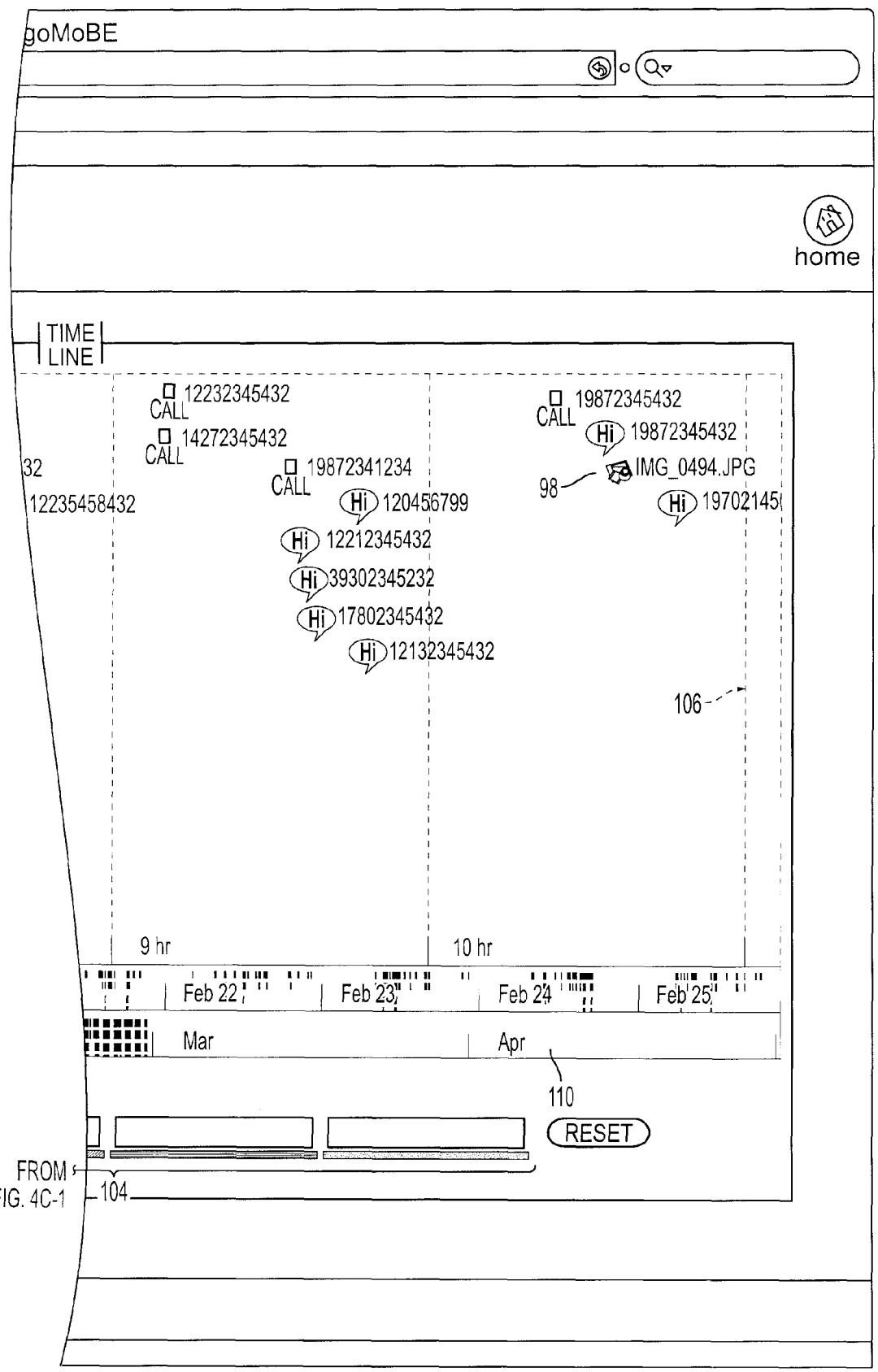

In FIG. 4C, a screenshot 90*c* of a user interface that displays various types of archived content and files 100. Specifically, as shown in the screenshot 90*c*, call logs, digital photos, voicemail messages, and other versions of local data generated using mobile device are shown. Each type of media content stored may be represented by an icon identifier 98 indicating which type of content the archive is (i.e., a voice conversation, text or instant messaging conversation, digital image, etc.) Filter 102 and highlight controls 104 allow a user to apply a selection criteria to the archive data to retrieve and display only the content desired. The color highlight controls 104 may present the entered keywords found in distinct colors facilitating the viewing of desired content. The content may be arranged in a time line fashion that allows a user to scroll through the archived content by hour 106, day 108 or month 110.

Figures 1, 4D:
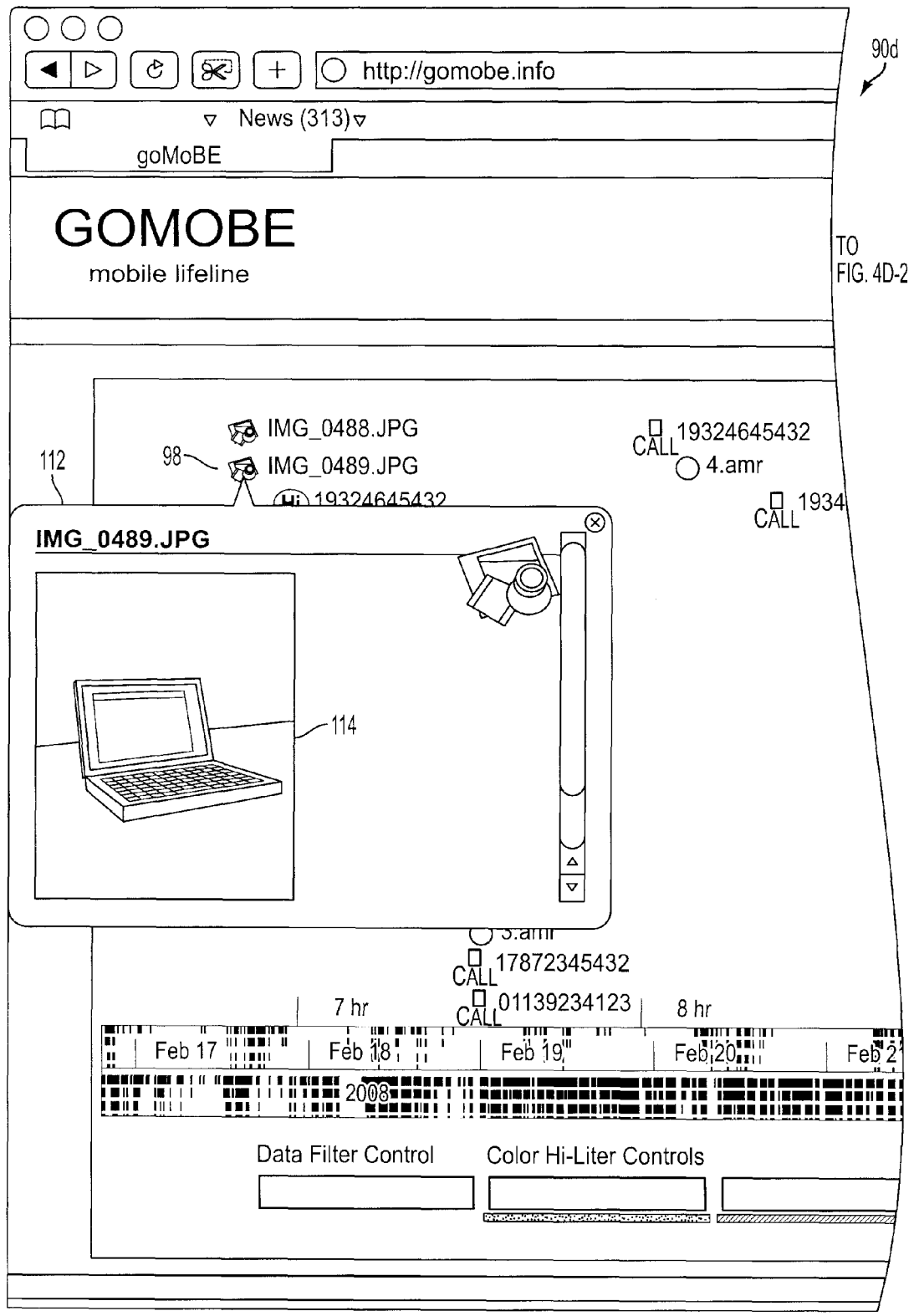
Figures 2, 4D:
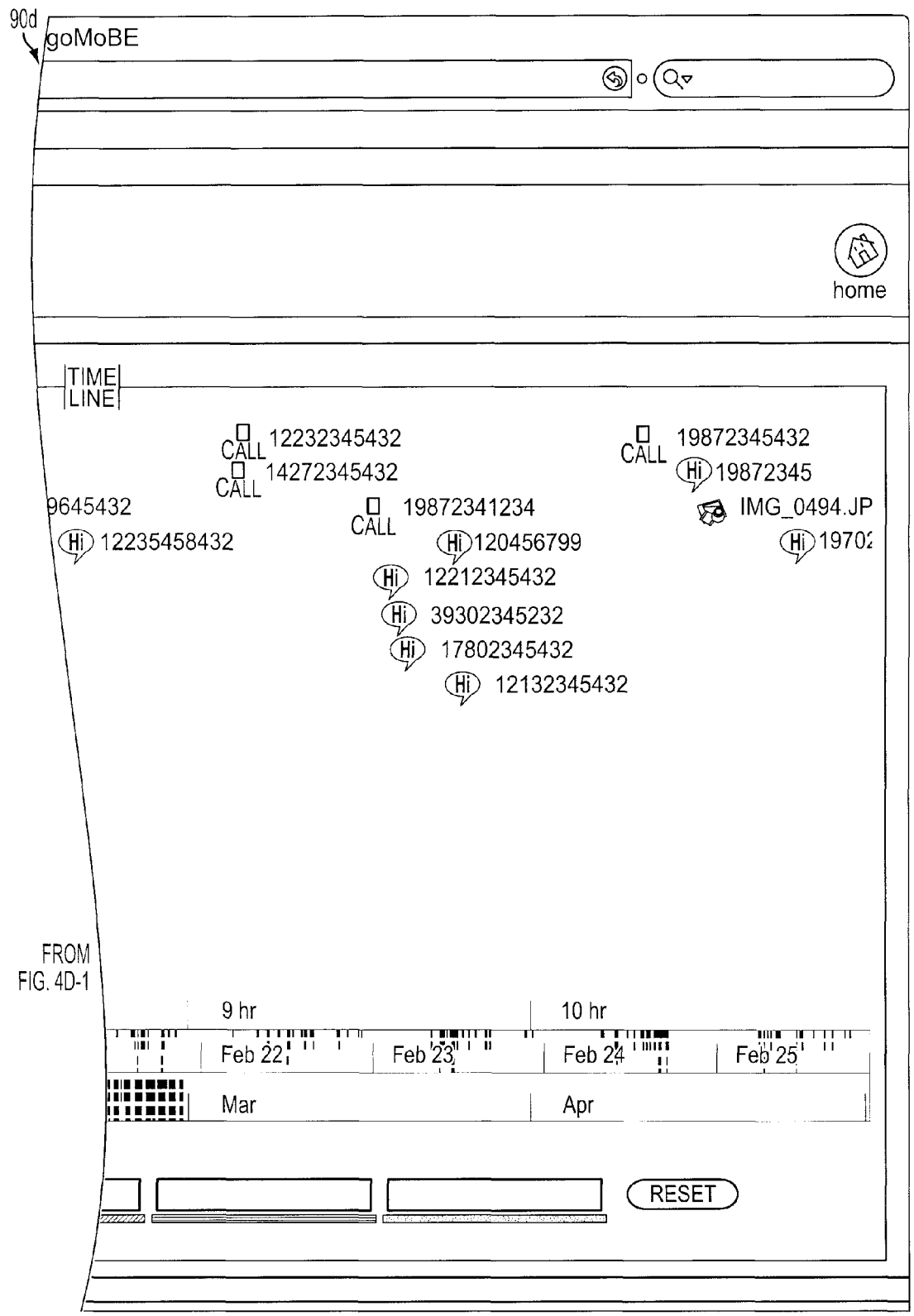
Figures 1, 4E:
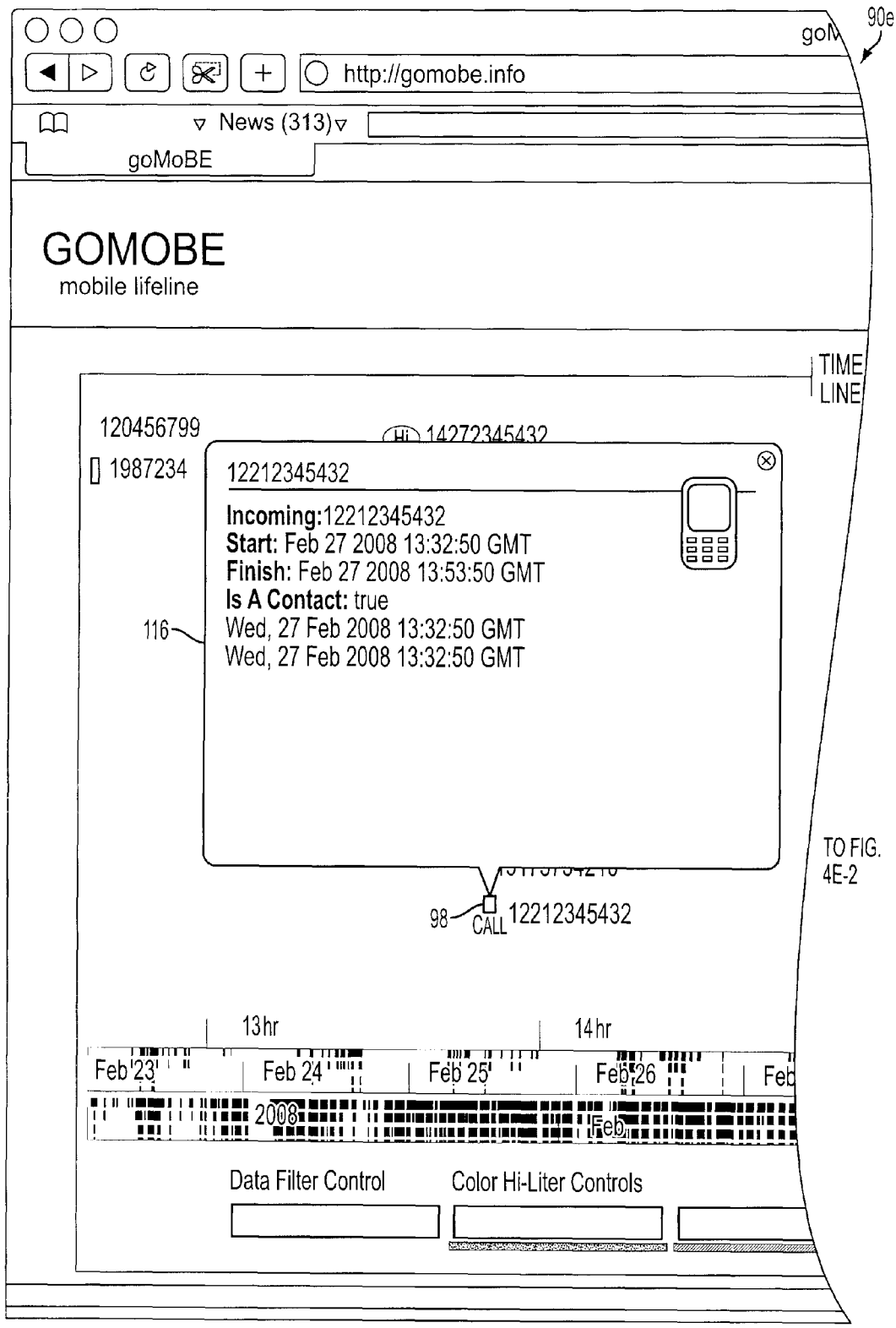
Figures 2, 4E:
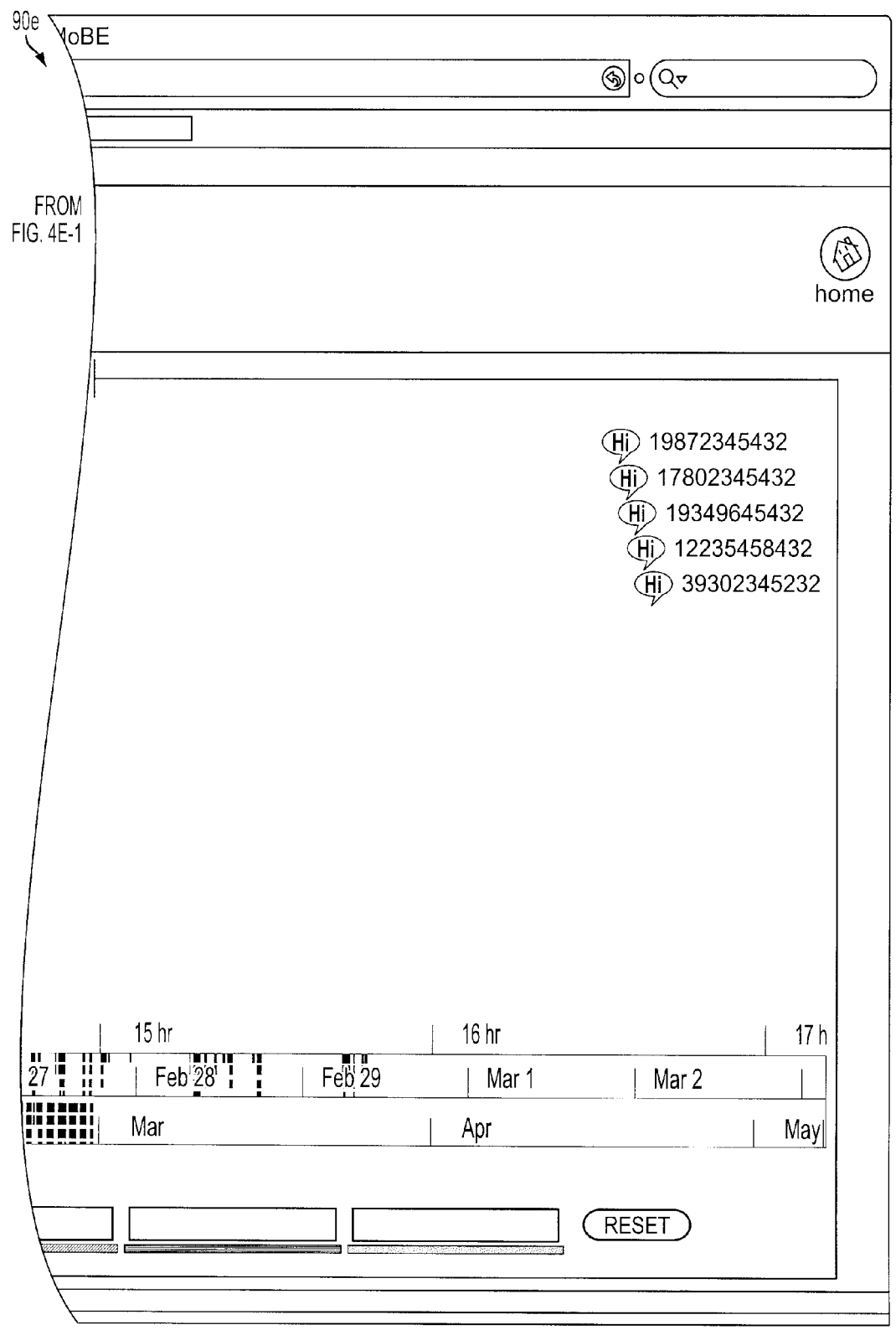

In FIG. 4D, a screenshot 90*d* of a user interface showing a digital photo being accessed using the interface is illustrated. Selecting an image icon 98 initiates a pop-up bubble displaying a thumbnail image of the selected file. Clicking on the thumbnail image itself will open up the full image file in its original size. Similarly, in FIG. 4E, a screenshot 90*e* of a user interface that shows a call log record being accessed is illustrated. Clicking on the call log icon 98 initiates a pop-up bubble 116 displaying call log info from the record selected.

Figures 1, 4F:
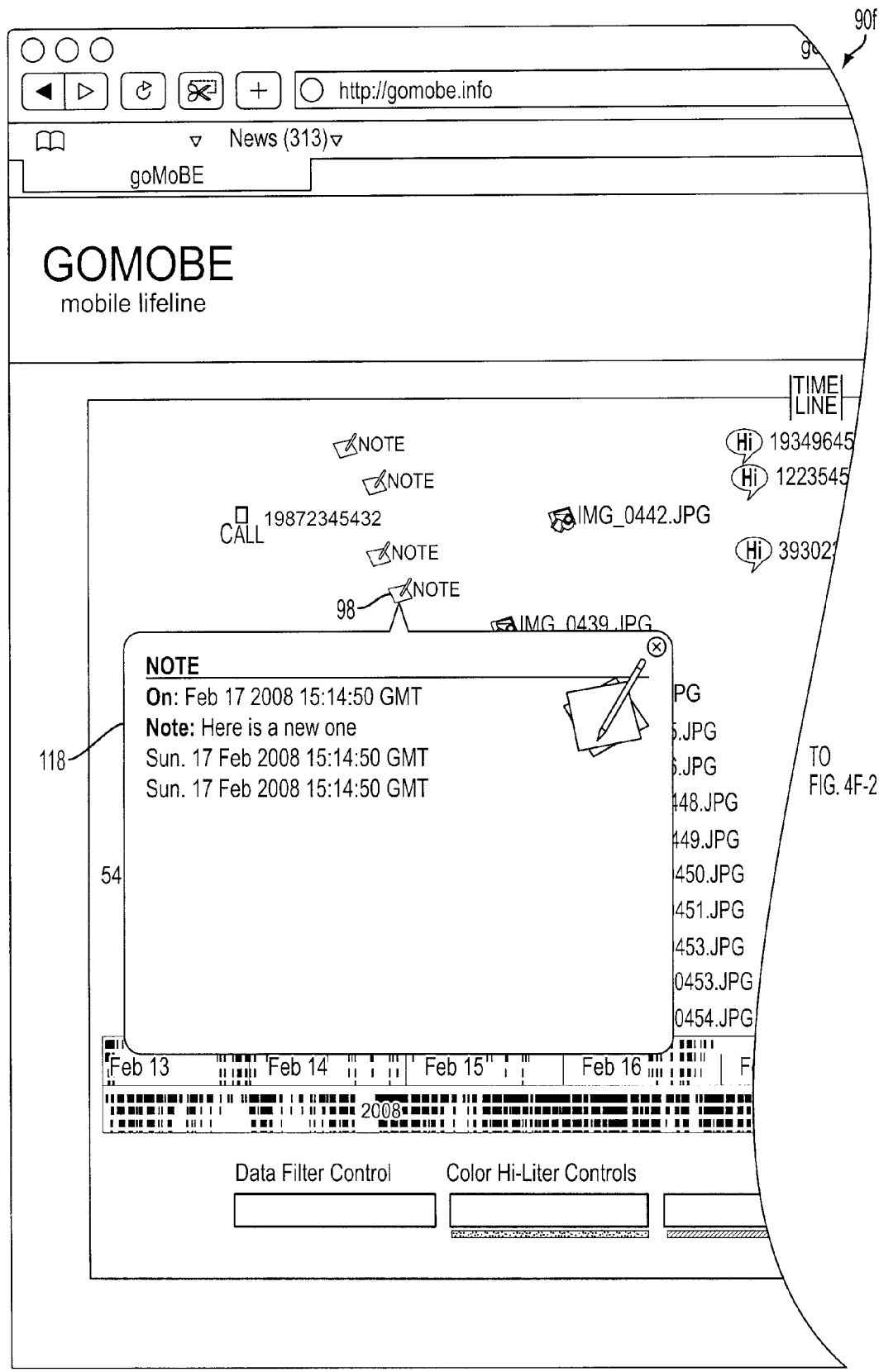
Figures 2, 4F:
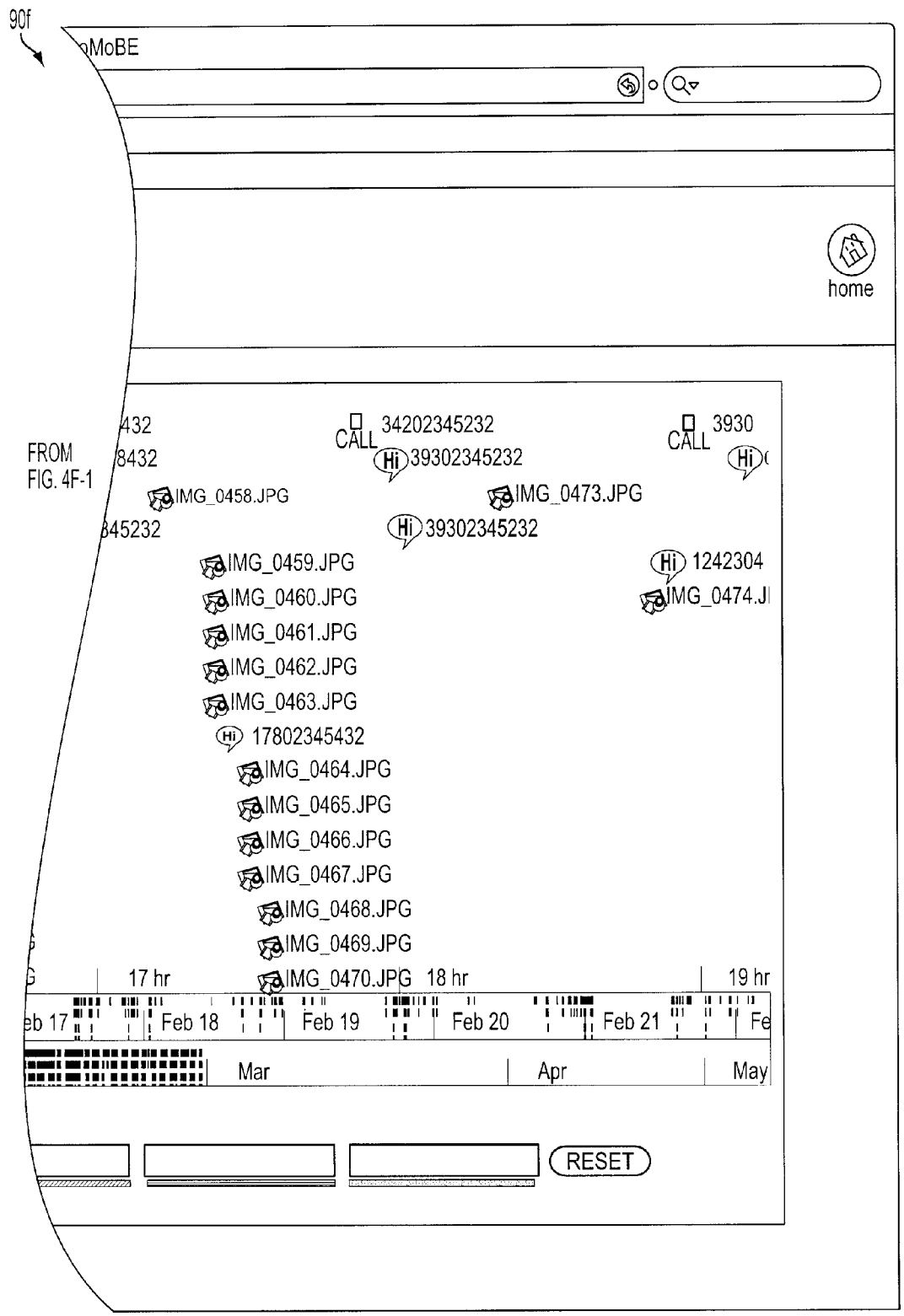
Figures 1, 4G:
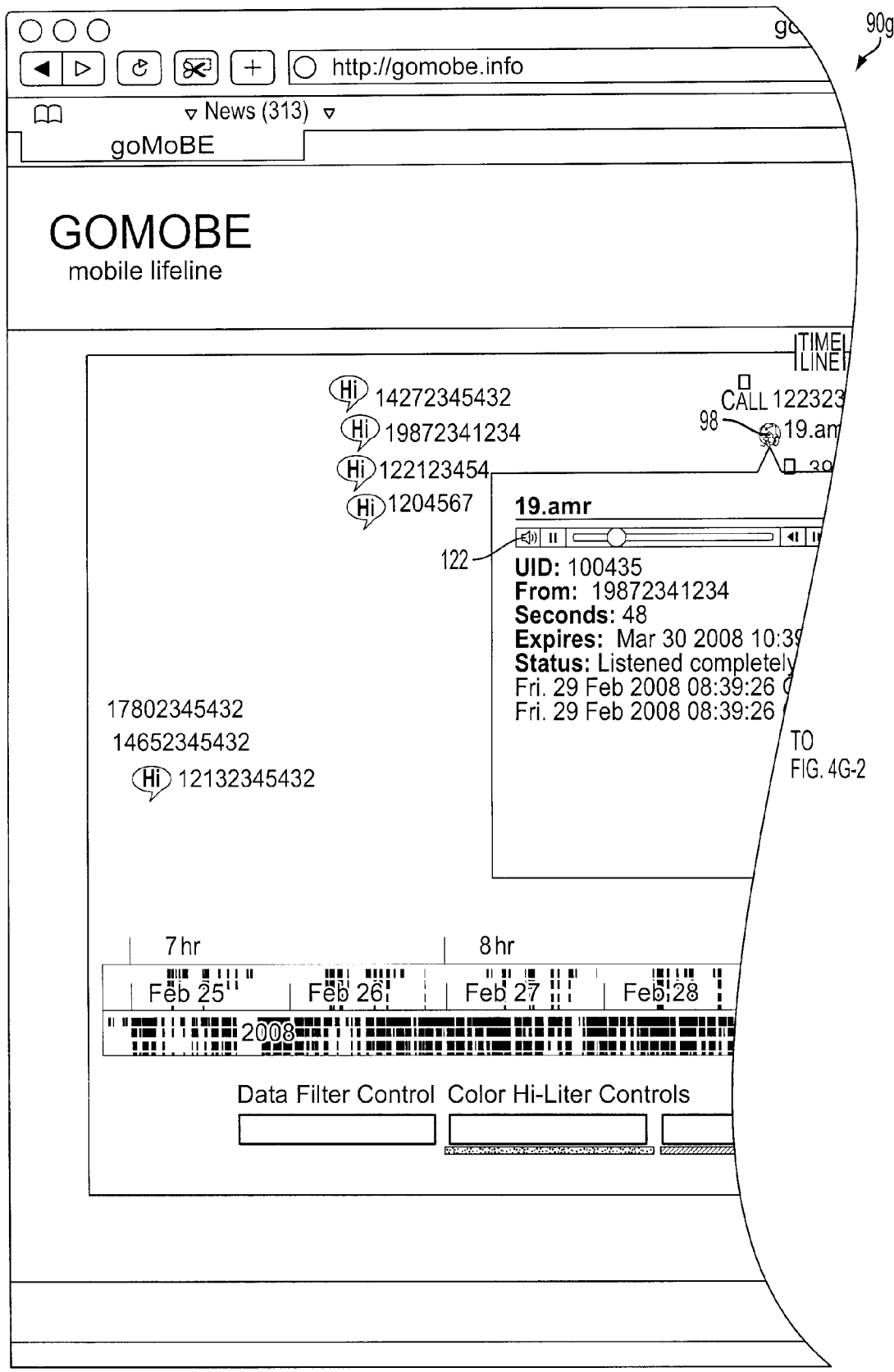
Figures 2, 4G:
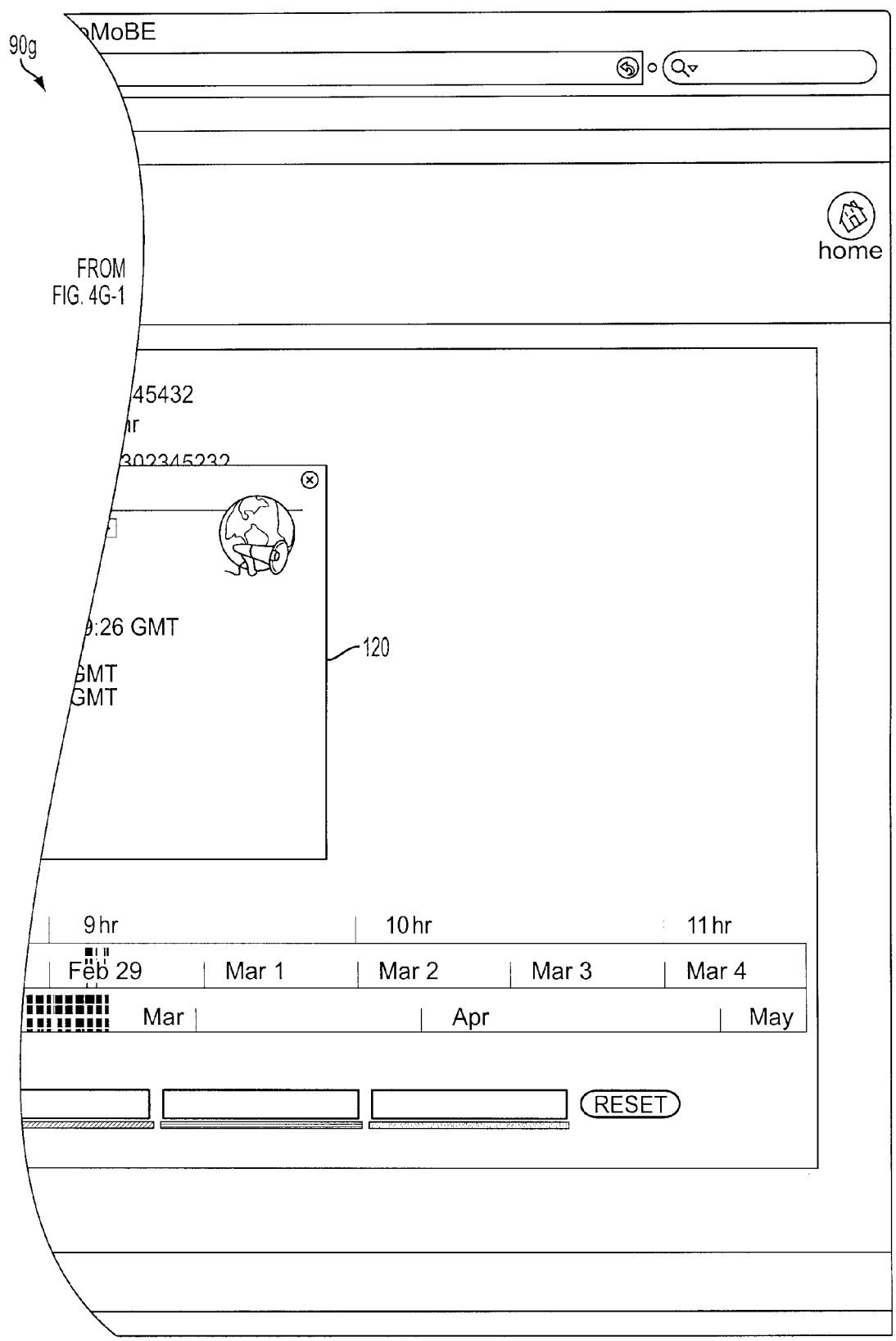

In FIG. 4F, a screenshot 90*f* of a user interface is illustrated showing the selection of a Note record. Clicking on the Note icon 98 initiates a pop-up bubble 118 displaying the contents of the Note record selected. The displayed contents may also include metadata or other data showing time and date of creation, last viewing, last edit, etc. In FIG. 4G, a screenshot 90*g* of a user interface is illustrated showing the selection of a voicemail record. Clicking on the voicemail icon 98 initiates a pop-up bubble 120 displaying voicemail log info from the record selected.

In turn, play controls 122 are displayed with-in the bubble 120 allowing the user to play, pause and control the volume of the playback of the voicemail record. In one embodiment, selection of the voicemail icon automatically initiates the playback of the record. Metadata and other data about the voicemail record may also be displayed, such as call time, length, data, and status messages regarding the playback of the message (e.g., unheard, new, old, previously started, listened completely, etc.).

Figures 1, 4H:
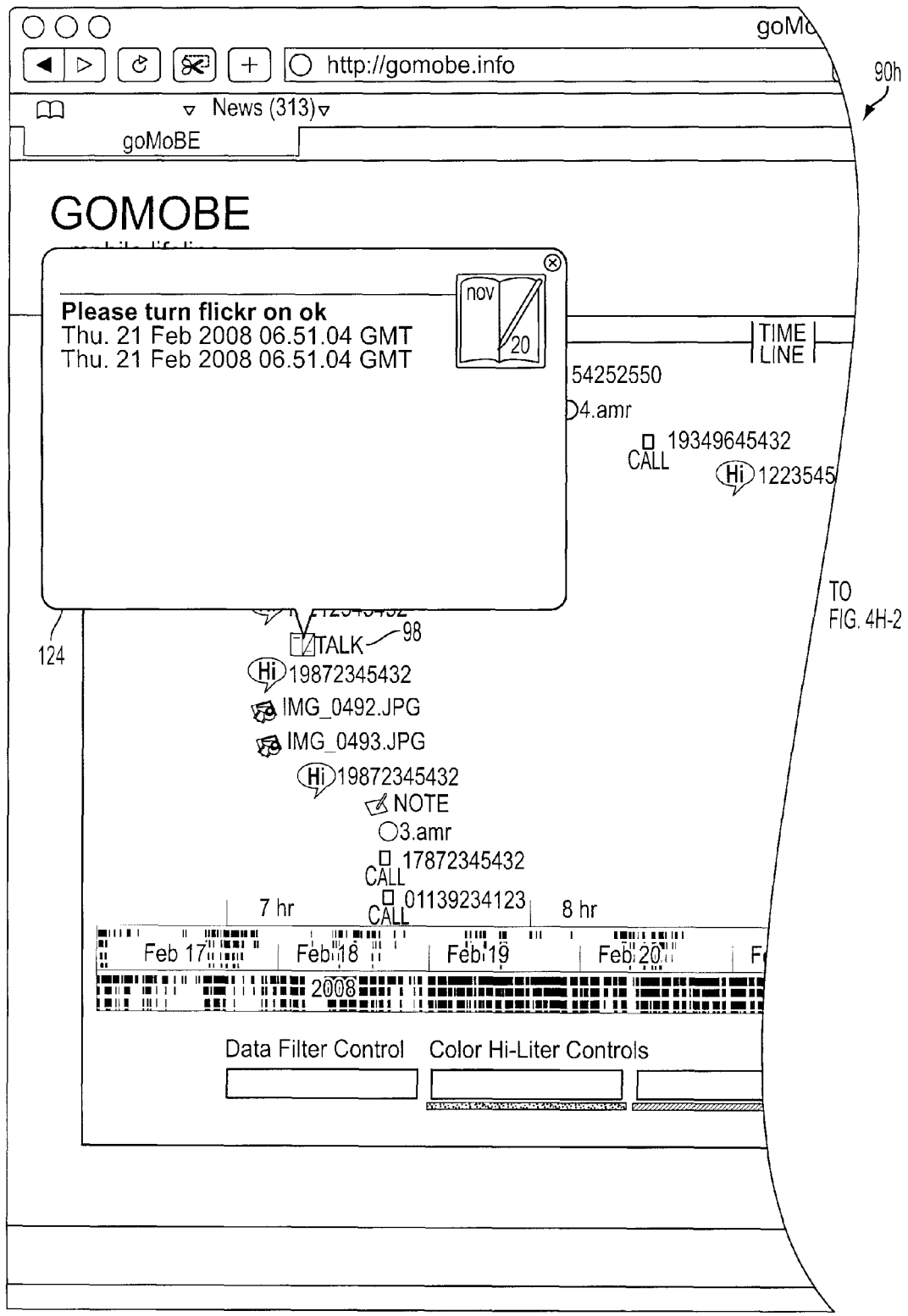
Figures 2, 4H:
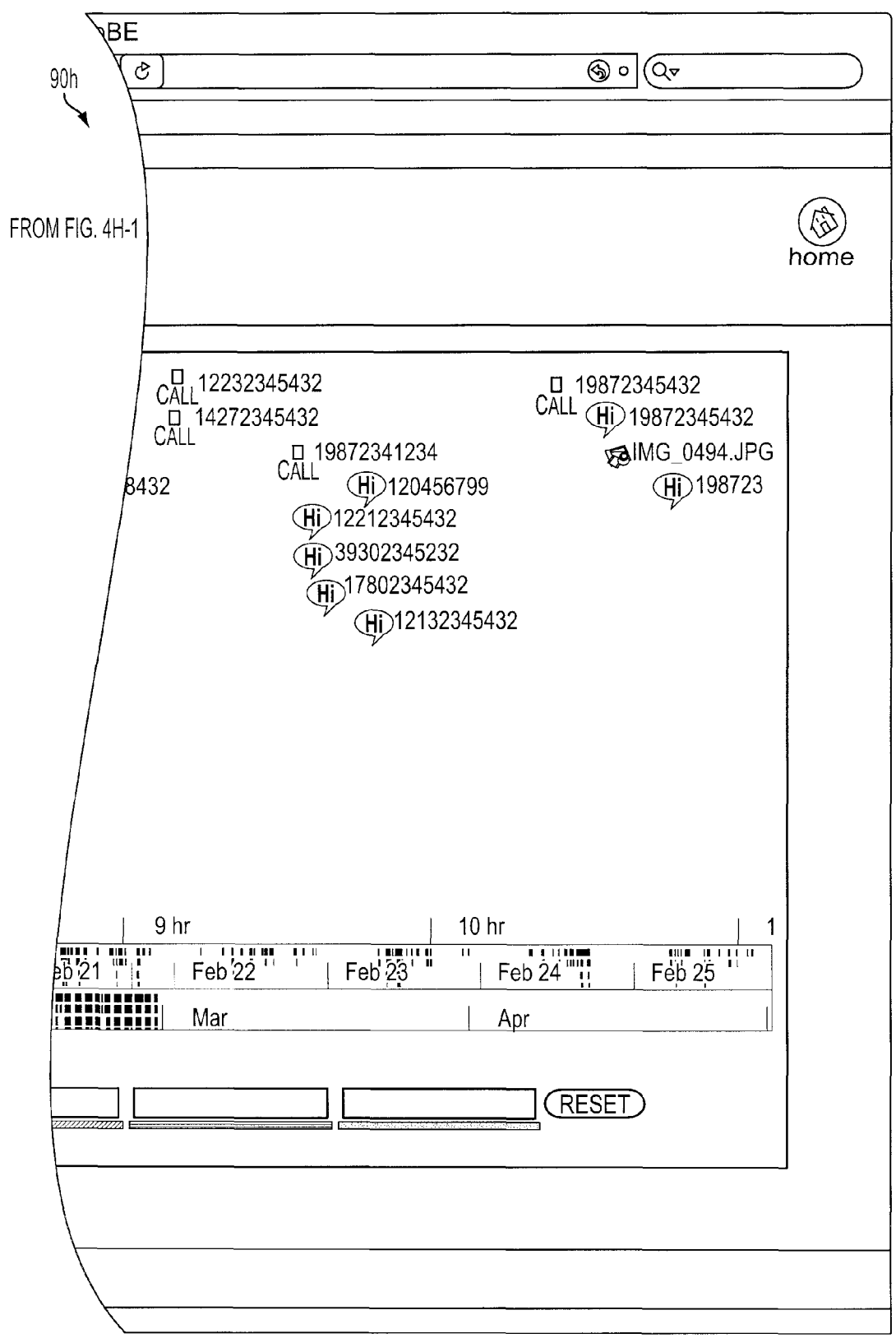

In FIG. 4H, a screenshot 90*h* of a user interface is illustrated showing accessing a talk record that includes SMS based instructions to turn a flicker account "on." Clicking on the talk log icon 98 initiates a pop-up bubble 124 displaying call log info from the record selected. The contents of the bubble 124 display the text of SMS messages sent to the relevant control peer.

Figures 1, 4I:
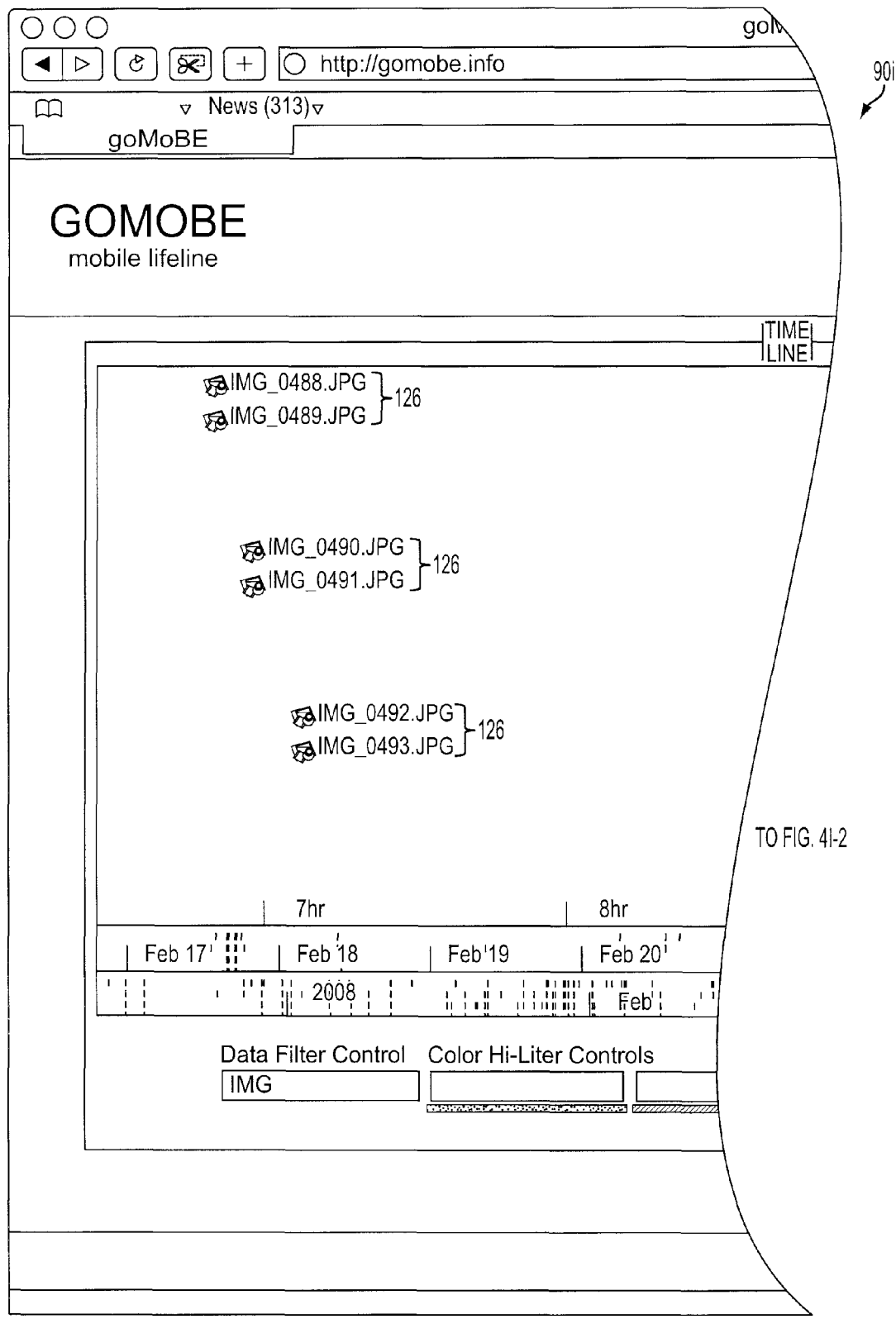
Figures 2, 41:
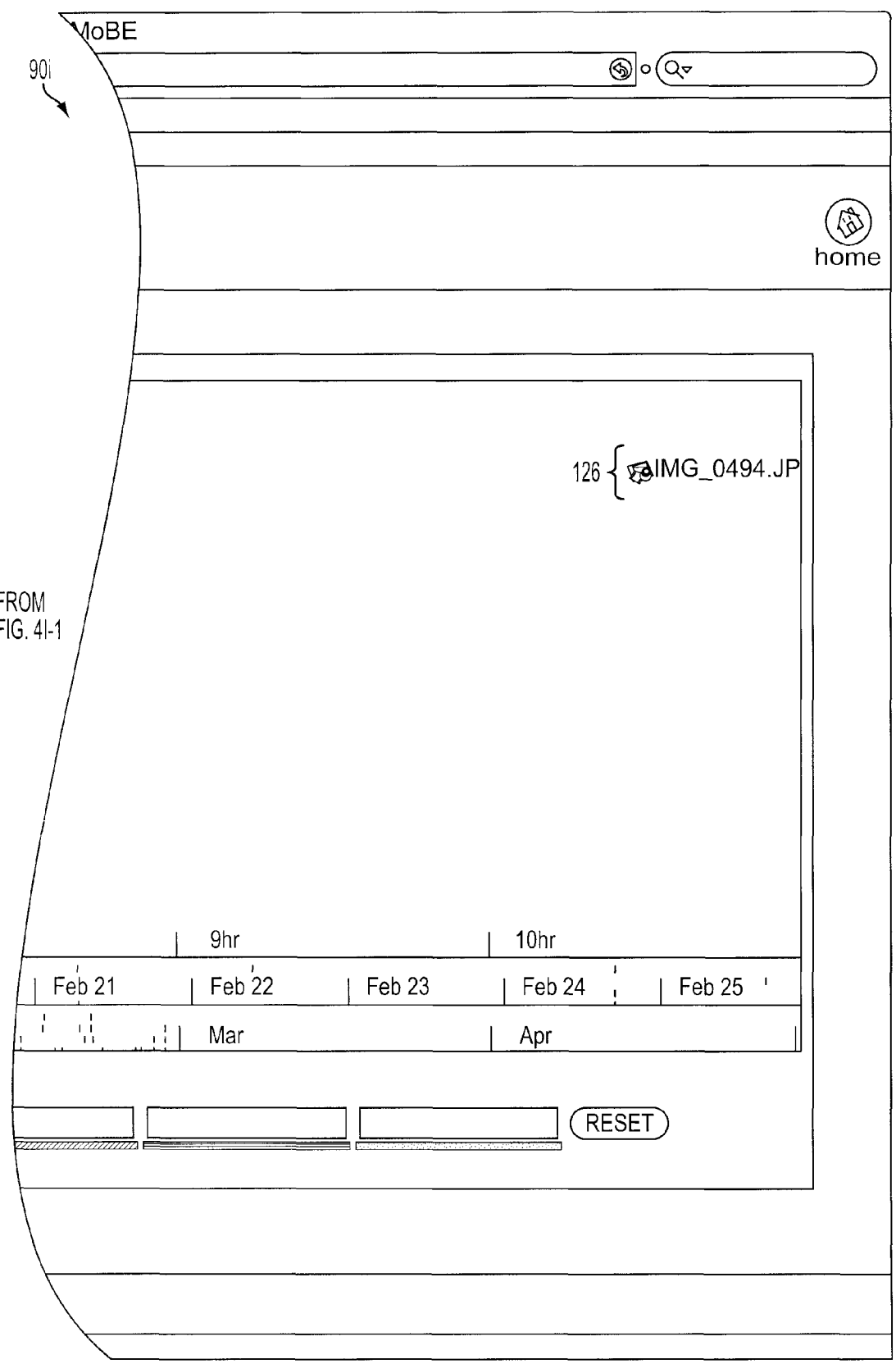

In FIG. 4I, a screenshot 90i of a user interface is illustrated after applying the data filter controls 102 to display only records containing the keyword "IMG" for image files. After applying the filter, only the "IMG" records 126 are displayed in their locations in the time line chronology.

Figures 1, 4J:
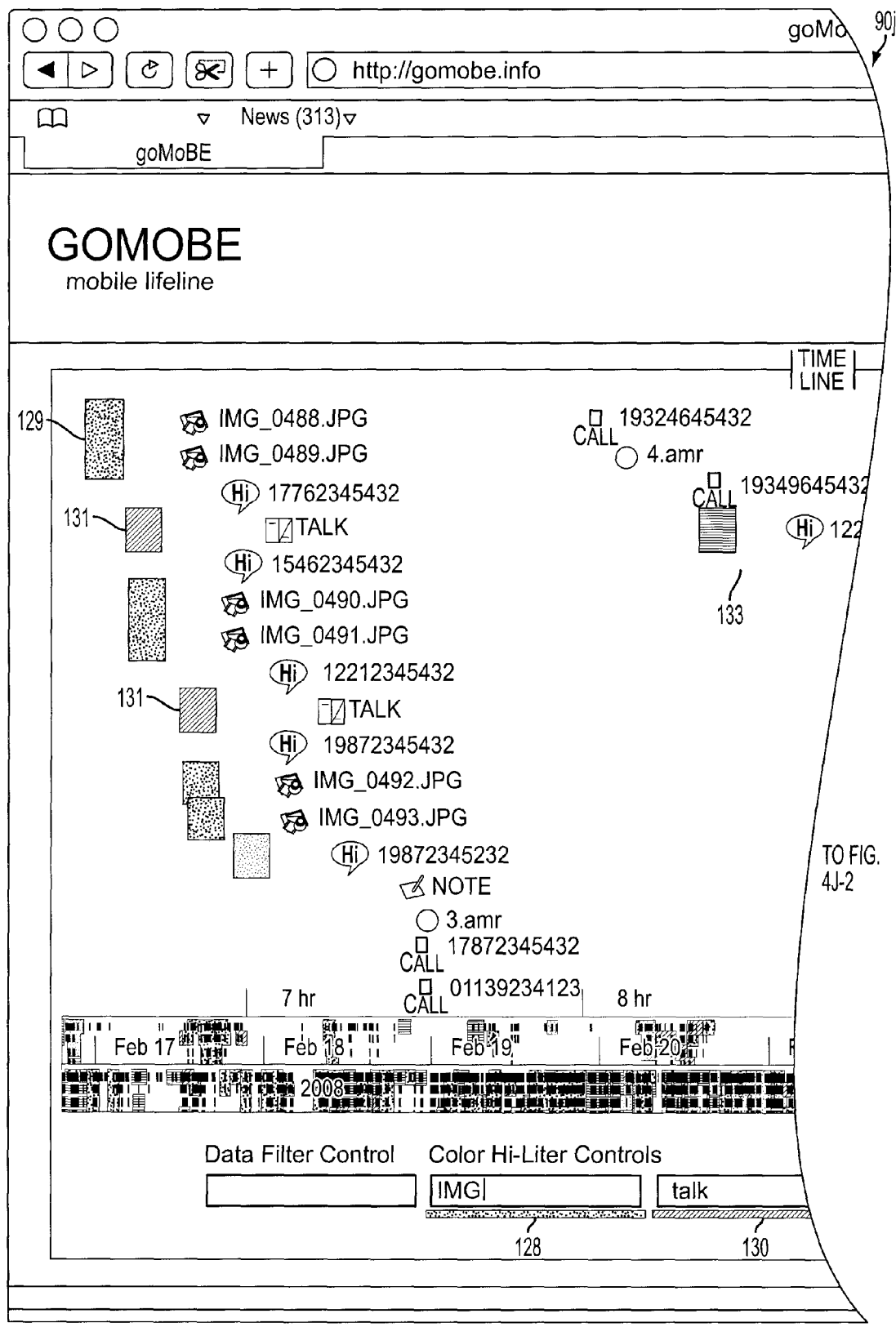
Figures 2, 4J:
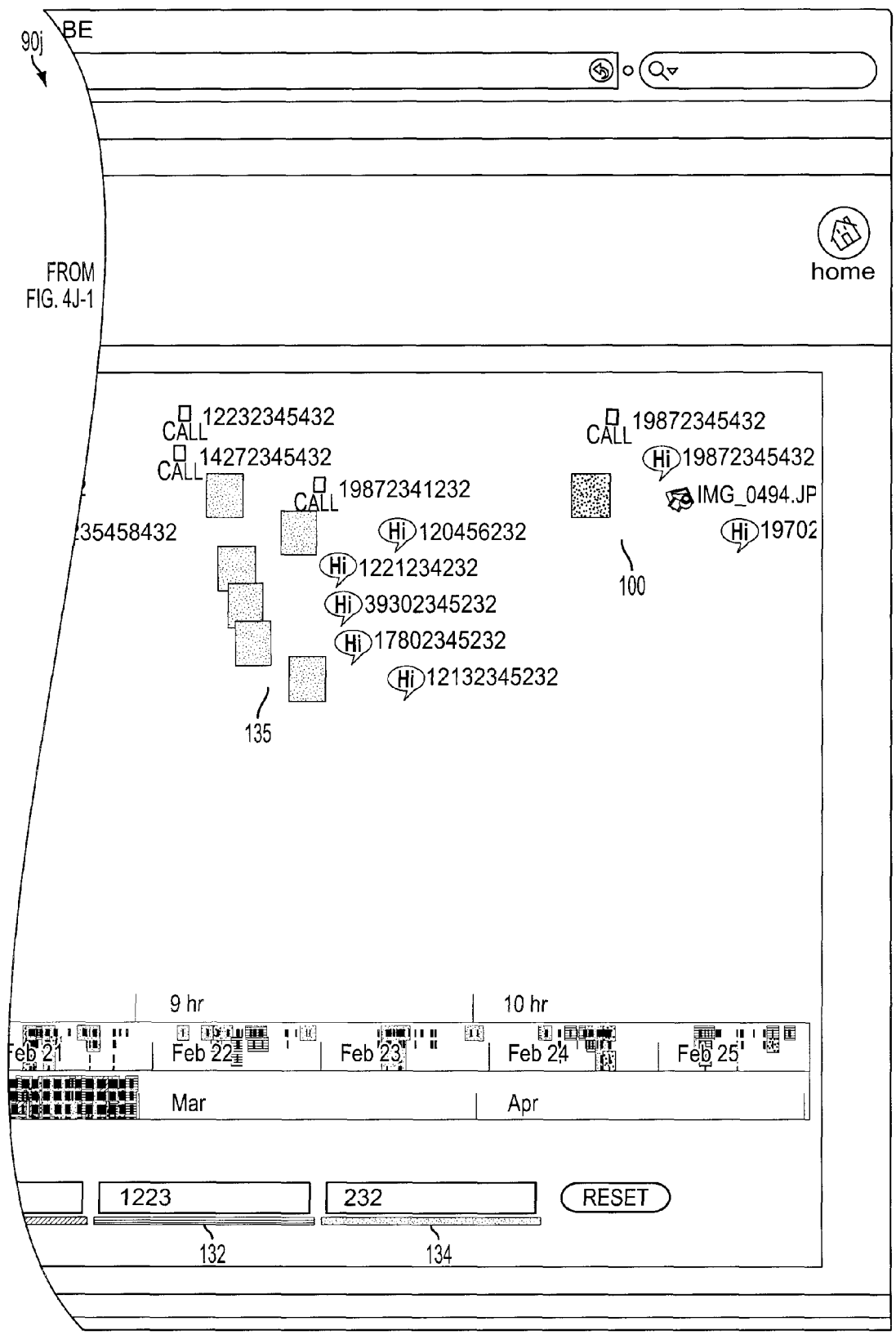

In FIG. 4J, a screenshot 90j of a user interface is illustrated after applying the color highlight controls 104 to the archive. In the illustrative example, the keyword "IMG" is entered in the first highlight control dialog box 128. The icons for records containing the keyword "IMG" are displayed in a first color 129. The keyword "talk" is entered in the second highlight control box 130 resulting in the "talk" records being highlighted in a second color 131. The keyword "1223" is entered in the third highlight control box 132 resulting in the records containing the keyword being highlighted in a third color 133. The keyword "232" is entered in the forth highlight control box 134 resulting in the records containing the keyword being highlighted in a forth color 135.

Many free and pay-per-use online photo galleries exist that allow a user to share photos with others. One example of such an archive is the popular "Flickr" service. In one embodiment, the application client automatically transmits photos captured by or otherwise generated using the mobile device to a user's photo gallery account with the online archive provider. In another embodiment, a user or a friend of the user may utilize a digital video recorder or cable set top box that serves as the remote location and application server to which a version of local data, such as pictures and videos can be sent. In addition to archiving photos to an online photo gallery or repository, the client also allows users to push, pull or otherwise stream data to other users of the service.

In one embodiment, since the client application can already access voicemails and other media files that include audio content, the processing application can be configured to convert a user's voicemail or other audio files, such as dictated memos to text and archive the resultant text at the application server.

In one embodiment, the mobile device includes a location based service that includes GPS functionality. In this embodiment, the client application can access a call log, a GPS tag, and a mapping functionality and use these in conjunction with the processing application to generate different products such as automatically GPS tagged picture archives.

In another embodiment, the client application and related services can be used to monitor mobile device activity. Further, if the mobile device includes location based services, such as services that use GPS data, mobile device position can also be monitored. Thus, it is possible to correlate where a user was located when the client application or related service made or received a call, or performed another action, such as archiving data, using the client application.

The device, software, methods, and systems described herein can incorporate various network-based technologies. In various embodiments, suitable network-based technologies for transmitting and receiving local data and processed versions in thereof include, but are not limited to cellular, infrared (IR), satellite, Bluetooth, wide area network (WAN) and WLAN, Wireless Fidelity (Wi-Fi) such as 802.x_ standardized systems and are to be used generically when referring of any type of 802.11 network, whether IEEE 802.11b, 802.11a, 802.16, 802.20 dual-band, GPRS, CDMA, EDGE, WCDMA, CDMA2000, TD-SCDMA network, UWB/W-USB, ZigBee, NFC and WiMax.

Embodiments may operate over current mobile communication networks based on either Code Division Multiple Access (CDMA) or Global Systems Mobile (GSM) standards, or other systems. The device network and the internet can be accessed using various protocols and auxiliary networks, including the suitable network-based technologies discussed above.

In addition to the client application resident on the mobile device, an overall service including certain hardware components, such as servers that act as peers or processing elements can also be established to facilitate to the transfer and processing of local data. Servers suitable for performing the processing, routing, transmission, and archiving of local data can use a windows-based operating system, a Mac based, a Linux-based operating system, or any other suitable open source or proprietary operating system.

The servers may have traditional hardware configurations, each having about two megabytes of RAM; disk space ranging from 120 up to 360 gigabytes of storage. The servers may be wireless or LAN-based.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system.

Memory may also include any means for storing software or other instructions including, for example and without limitation, a hard disk, an optical disk, floppy disk, DVD (digital versatile disc), CD (compact disc), memory stick, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the invention.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

We claim:

1. A method of providing remote access to data generated by a mobile device having a device storage element, the method comprising the steps of:
   (a) monitoring the mobile device such that changes in local data resident in the device storage element are detected using a client application installed on the mobile device, wherein the changes in the local data accumulate during a period of time to comprise at least one change set;
   (b) transmitting the at least one change set over a network;
   (c) receiving the at least one change set at a remote server, the remote server having a remote storage element; and
   (d) processing the at least one change set using a server application to generate user accessible remote data.

2. The method of claim 1 wherein the step of transmitting the at least one change set over a network is performed using a connectionless protocol.

3. The method of claim 1 wherein the step of transmitting the at least one change set is performed automatically when a change in the local data resident in the device storage element is detected.

4. The method of claim 1 wherein the user accessible remote data is an archived version of the local data.

5. The method of claim 1 wherein the local data is selected from a group consisting of: digital photos, voice mail messages, log files, a barcode image, email messages, notes, text messages, meta-data, version data, media files, and application generated files.

6. The method of claim 1 wherein the mobile device is one of a mobile phone, a smartphone, a media content player, and a personal digital assistant (PDA).

7. The method of claim 1 wherein the user accessible remote data is selected from a group consisting of: a digital photo album, a barcode database, a browser accessible digital photo archive, a text message archive, a voicemail archive, and an archive of mobile device generated files.

8. The method of claim 1 further comprising the step of displaying user accessible remote data using a scrollable chronological interface.

9. A method executed by a mobile programmable apparatus for remotely archiving digital photos, the method comprising the steps of:
   (a) transmitting a digital photo and data associated with the digital photo in response to a single user action, wherein the digital photo was stored locally on the mobile programmable apparatus;
   (b) routing the digital photo and associated data from the mobile programmable apparatus such that the digital photo and associated data are received by an archival server having a remote data storage element; and
   (c) generating an archival version of the digital photo with the associated data.

10. The method of claim 9 further comprising the step of processing the archival version of the digital photo and data using a digital imaging application.

11. The method of claim 9 further comprising the step of storing the archival version of the digital photo and data in the remote data storage element.

12. The method of claim 9 further comprising the steps of monitoring the mobile programmable apparatus for a change relating to any digital photos present on the mobile programmable apparatus and prompting a user with an opportunity to perform the single user action when the change is detected.

13. The method of claim 9 wherein the archival version of the digital photo and the data are selected from a group comprising: an electronic copy of the digital photo, a resized version of the digital photo, a digital photo album, digital photo meta-data, a GPS tagged photo, a barcode image, and a browser accessible digital photo archive.

14. The method of claim 9 wherein the programmable apparatus is one of a mobile phone, a smartphone, a media content player, and a personal digital assistant (PDA).

15. A mobile device, the mobile device comprising:
   (a) an input device, the input device responsive to a user action;
   (b) a storage element, the storage element sized to store at least one media file;
   (c) a transmission application stored with the storage element, the transmission application designed to transmit at least a portion of a media file to a remote location;
   (d) a processor, the processor programmed to:
      (1) detect changes in any media files stored in the storage element,
      (2) initialize the transmission application in response to the user action,
      (3) cause the transmitter to transmit the change; and
   (e) a transmitter in electronic communication with the processor and the storage element.

16. The device of claim 15 wherein the transmission application further comprises a transmission protocol selection module.

17. The device of claim 15 wherein the transmission application is adapted to automatically transmit the media file when a change in the media files resident in the storage element is detected.

18. The device of claim 15 wherein the processor is further programmed such that the media file is transmitted to the remote location using a connectionless protocol.

19. The device of claim 15 wherein the at least one media file is selected from a group consisting of: digital photos, voice mail messages, a barcode image, log files, email messages, notes, text messages, media files, GPS tags, and application generated files.

20. The device of claim 15 wherein the mobile device is one of a mobile phone, a smartphone, a media content player, and a personal digital assistant (PDA).

21. A mobile device-based data transfer system comprising:
   (a) a remote peer configured to interface with a first application, the first application installed on the mobile device, the mobile device containing local data,
      the remote peer comprising:
         (i) a change set receiving module configured to receive and process changes in local data received from the mobile device, wherein the changes that accumulate during a period of time comprise at least one change set;
  (ii) a processing element, the processing element configured to process the at least one change set to generate user accessible remote data; and
  (iii) a remote storage element configured to store one of the at least one change set or the user accessible remote data.

22. The mobile device-based data transfer system of claim 21 wherein the remote peer receives a portion of data originating from the mobile-device using a connectionless protocol.

23. The mobile device-based data transfer system of claim 21 wherein the local data is selected from a group consisting of: digital photos, voice mail messages, log files, email messages, notes, text messages, media files, meta-data, version data, and application generated files.

24. The mobile device-based data transfer system of claim 21 wherein the user accessible remote data is an archived version of the local data.

25. The mobile device-based data transfer system of claim 21 wherein the user accessible remote data is selected from a group consisting of: a digital photo album, a browser accessible digital photo archive, GPS data archive, a text message archive, a voicemail archive, and an archive of mobile devices generated files.

26. The mobile device-based data transfer system of claim 21 wherein the user accessible remote data is an archived version of the local data.

27. The mobile device-based data transfer system of claim 21 wherein the remote peer is selected from the group consisting of a server, a mobile device, a digital video recorder, a cable television box, and a personal computer.

28. A mobile device-based data transfer system adapted for remote file processing, the system comprising:
  (a) a first application configured to interface with a remote peer, the first application installed on a mobile device, the first application configured to transmit and receive data from a local storage element, the local storage element in electrical communication with the mobile device;
  the first application comprising:
    (i) a monitoring element configured to detect changes in any media files stored in the storage element and to initialize a transmission element in response to the detected change, and to cause the transmission element to transmit at least the changes detected in any media files stored in the storage element;
    (ii) the transmission element configured to transmit at least one media file to a remote location in response to either one of the detected change in any media files and a user action; and
    (iii) a user interface, the user interface configured to initialize the transmission element in response to the user action and to cause the transmission element to transmit at least one media file.

29. The system of claim 28 wherein the transmission element comprises a transmission protocol selection module.

30. The mobile device-based data transfer system of claim 28 wherein the transmission element is configured to automatically transmit the at least one media file when a change in the media files resident in the storage element is detected by the monitoring element.

31. The mobile device-based data transfer system of claim 28 wherein the at least one media file is selected from a group consisting of: digital photos, voice mail messages, log files, email messages, notes, a GPS-based map, text messages, media files, and application generated files.

32. The mobile device-based data transfer system of claim 28 wherein the mobile device is one of a mobile phone, a smartphone, a media content player, and a personal digital assistant (PDA).

33. The mobile device-based data transfer system of claim 28 wherein the first application is selected from the group consisting of a client application, a peer-to-peer application, a browser and a server application.

34. A method of providing remote access to data generated by a mobile device having a device storage element, the method comprising the steps of:
  (a) monitoring the mobile device such that changes in local data resident in the device storage element are detected using a first peer-to-peer application installed on the mobile device, wherein the changes in the local data accumulate during a period of time to comprise at least one change set;
  (b) transmitting the at least one change set over a network;
  (c) receiving the at least one change set at a remote peer, the remote peer having a remote storage element; and
  (d) processing the at least one change set using a second peer-to-peer application to generate user accessible remote data.

35. The method of claim 34 wherein the step of transmitting the at least one change set over a network is performed using a connectionless protocol.

36. The method of claim 34 wherein the step of transmitting the at least one change set is performed automatically when a change in the local data resident in the device storage element is detected.

37. The method of claim 34 wherein the change set comprises GPS data and time stamp data and wherein the user accessible remote data is a report tracking a position of the mobile device and when the local data was created.

38. A method executed by a mobile programmable apparatus for remotely archiving text messages, the method comprising the steps of:
  (a) transmitting a text message and data associated with the text message in response to a single user action, wherein the text message was stored locally on the mobile programmable apparatus;
  (b) routing the text message and the data from the mobile programmable apparatus such that the text message and the data are received by an archival peer having a remote data storage element; and
  (c) generating an archival version of the text message and the associated data.

39. The method of claim 38 further comprising the step of processing the archival version of the text message and the associated data using a text processing software application to generate an auditory version of the text message and the associated data.

* * * * *